(12) United States Patent
Hastings

(10) Patent No.: US 8,008,563 B1
(45) Date of Patent: Aug. 30, 2011

(54) ELECTRONIC CIRCUIT DRIVEN, INTER-ACTIVE, PLURAL SENSORY STIMULI APPARATUS AND COMPREHENSIVE METHOD TO TEACH, WITH NO INSTRUCTOR PRESENT, BEGINNERS AS YOUNG AS TWO YEARS OLD TO PLAY A PIANO/KEYBOARD TYPE MUSICAL INSTRUMENT AND TO READ AND CORRECTLY RESPOND TO STANDARD MUSIC NOTATION FOR SAID INSTRUMENTS

(76) Inventor: Karla Kay Hastings, Austin, TX (US)

( * ) Notice: Subject to any disclaimer, the term of this patent is extended or adjusted under 35 U.S.C. 154(b) by 0 days.

(21) Appl. No.: 12/758,689

(22) Filed: Apr. 12, 2010

(51) Int. Cl.
*G09B 15/08* (2006.01)

(52) U.S. Cl. ............ 84/479 A; 84/470 R; 84/477 R

(58) Field of Classification Search ......... 84/479 A, 84/470 R, 477 R
See application file for complete search history.

(56) References Cited

U.S. PATENT DOCUMENTS

| | | | | |
|---|---|---|---|---|
| 1,133,074 | A * | 3/1915 | Von Unschuyld-Lazard | 84/470 R |
| 1,324,275 | A * | 12/1919 | Schantz | 84/477 R |
| 2,072,511 | A * | 3/1937 | Ross | 84/470 R |
| 2,505,608 | A * | 4/1950 | Edwards | 84/470 R |
| 3,208,327 | A * | 9/1965 | Allen | 84/471 R |
| 3,822,630 | A * | 7/1974 | Leonard | 84/471 R |
| 3,978,757 | A * | 9/1976 | Johnson, Jr. et al. | 84/485 R |
| 4,040,324 | A * | 8/1977 | Green | 84/478 |
| 4,041,828 | A * | 8/1977 | Leonard | 84/471 R |
| 5,392,682 | A * | 2/1995 | McCartney-Hoy | 84/470 R |
| 5,544,562 | A * | 8/1996 | Jeon | 84/470 R |
| 5,841,051 | A * | 11/1998 | Segan | 84/477 R |
| 6,133,518 | A * | 10/2000 | Kamimura et al. | 84/423 R |
| 6,204,441 | B1 * | 3/2001 | Asahi et al. | 84/470 R |
| 6,388,182 | B1 * | 5/2002 | Bermudez | 84/477 R |
| 6,982,375 | B2 * | 1/2006 | McGregor | 84/478 |
| 7,378,585 | B2 * | 5/2008 | McGregor | 84/600 |
| 7,414,186 | B2 * | 8/2008 | Scarpa et al. | 84/470 R |

* cited by examiner

*Primary Examiner* — Elvin G Enad
*Assistant Examiner* — Robert W Horn

(57) ABSTRACT

Electronic circuit controlled inter-active multi sensory prompting and monitoring musical keyboard instrument for teaching user—as young as two years old—how to play keyboard instrument without instructor assistance. Instrument comprised of black and white keys arranged in conventional order, made of suitable translucent material that can be illuminated by lights such as LEDs. Indicated child size right-hand and left-hand palms and fingers defined by shapes, each shape made wholly or partly from suitable colored and transparent material in order to function as a colored lens illuminated by light placed underneath each shape. Fitted with integrated vibration mechanism capable of vibrating each individual finger shape or key singly or jointly. Includes flat panel display screen capable of providing related musical instruction. Electronic circuit outputs to user audio instruction coupled with appropriate functions by components to develop the skill of playing instrument, reading and responding to standard musical notation.

12 Claims, 18 Drawing Sheets

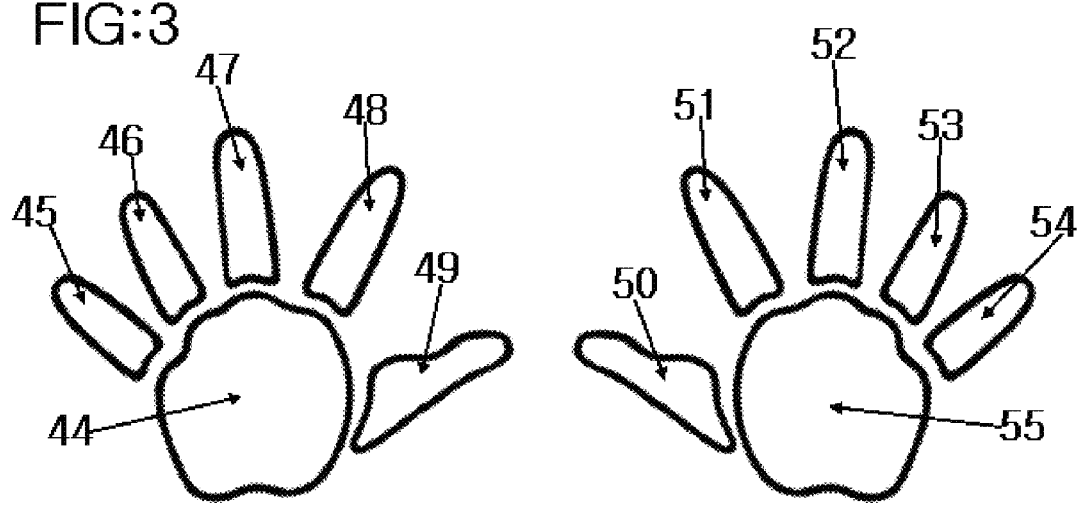
FIG:3
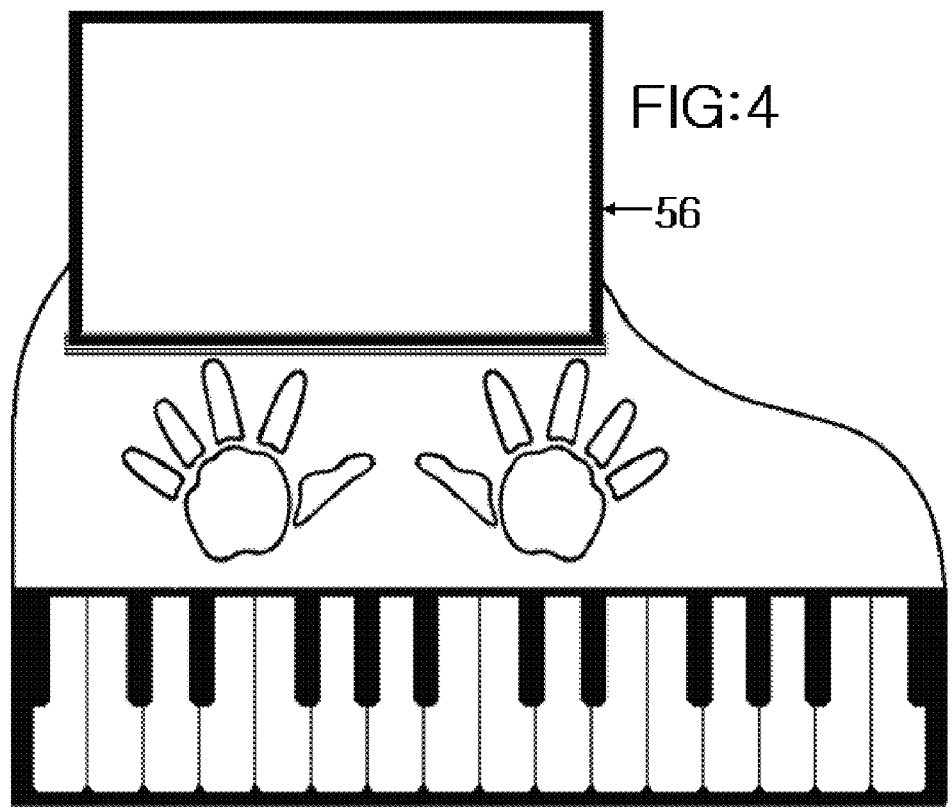
FIG:4

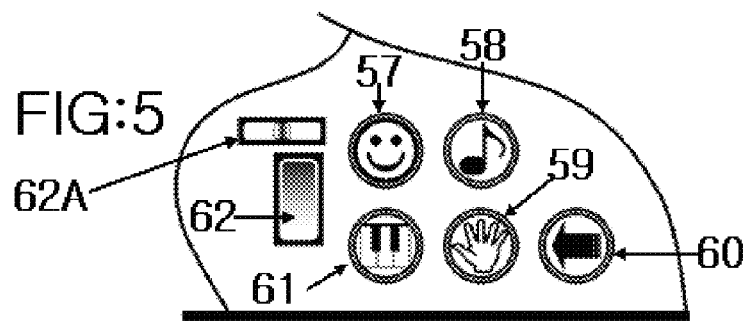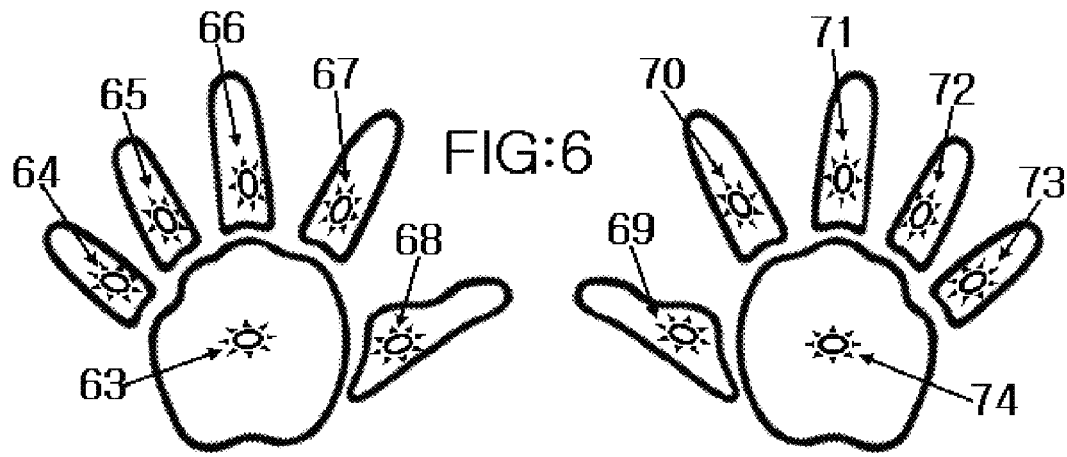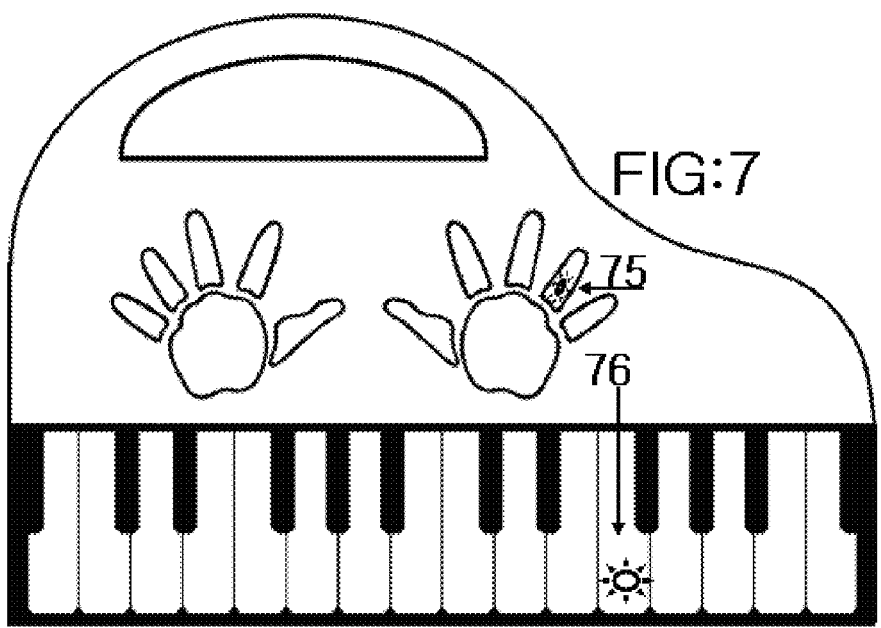

FIG:8
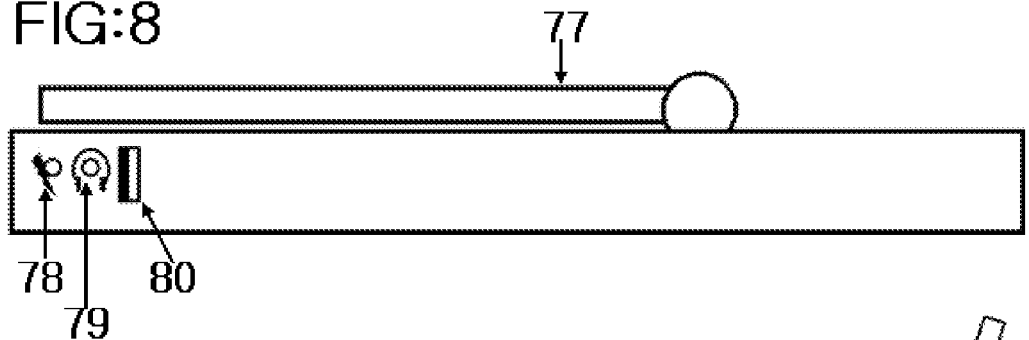
FIG:9
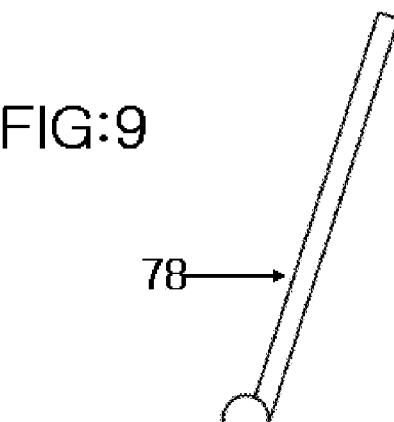
FIG:10
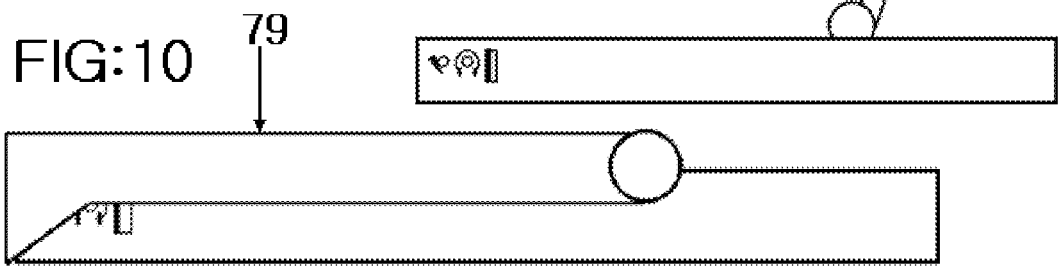
FIG:11
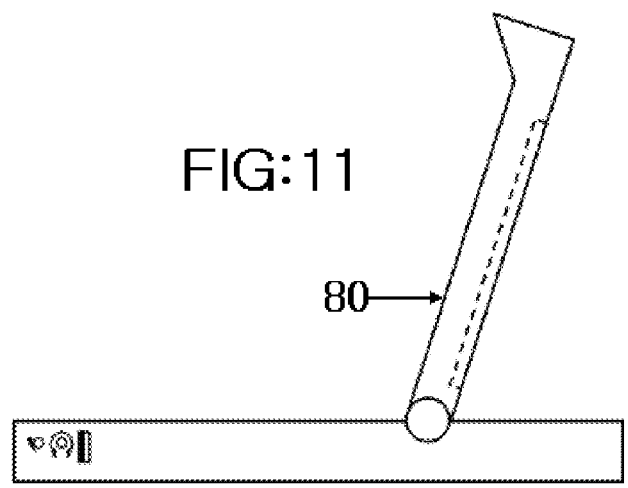

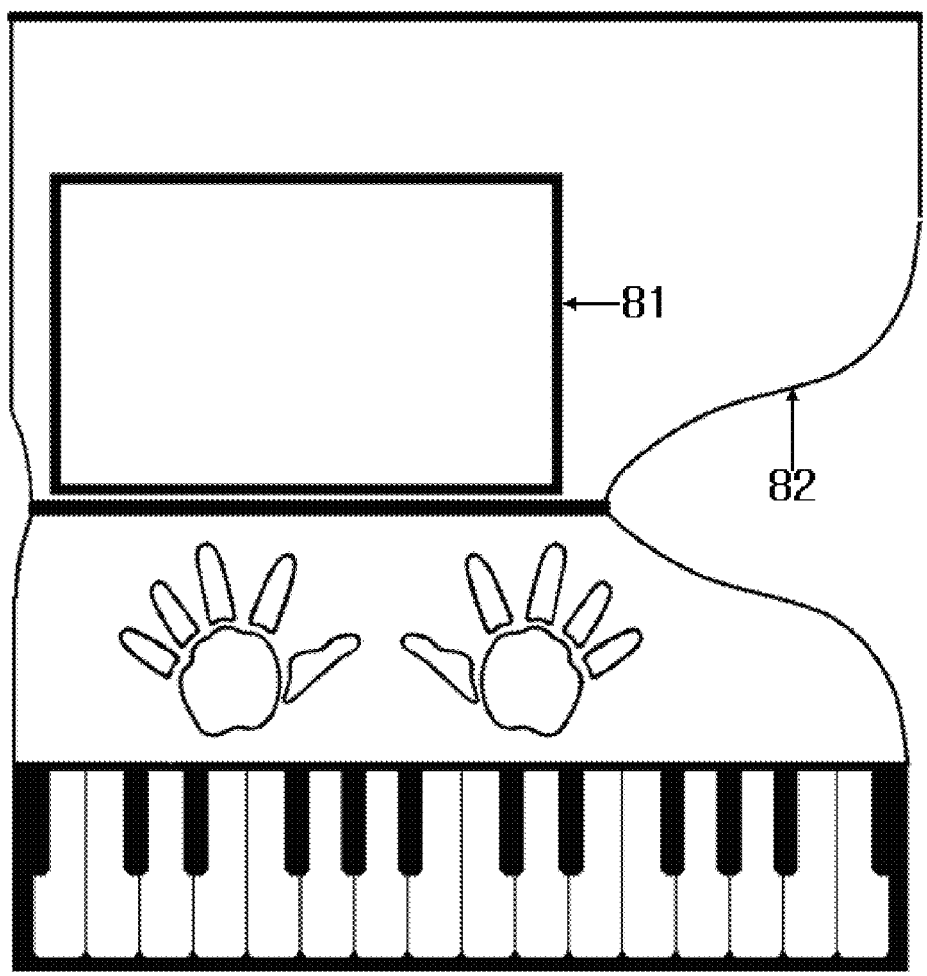

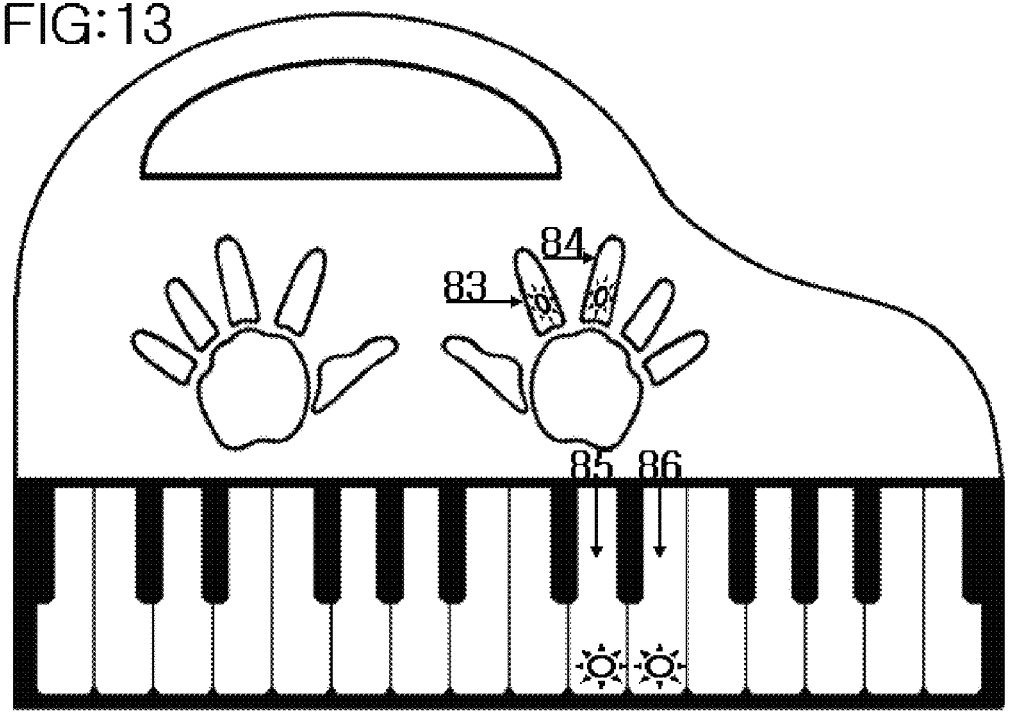
FIG:13
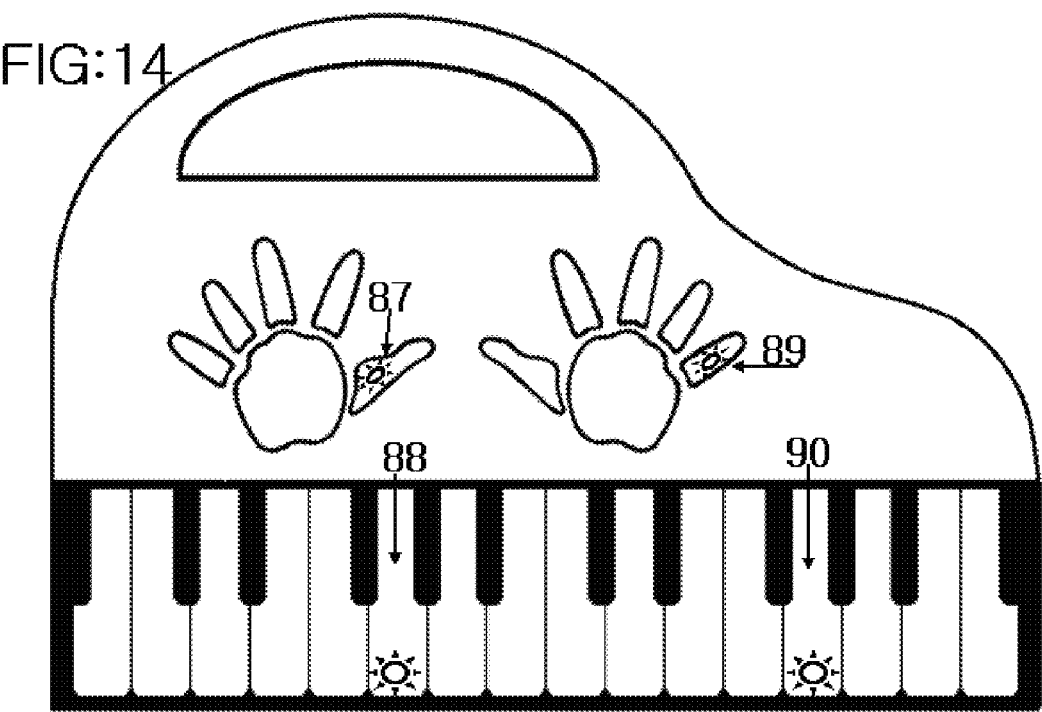
FIG:14

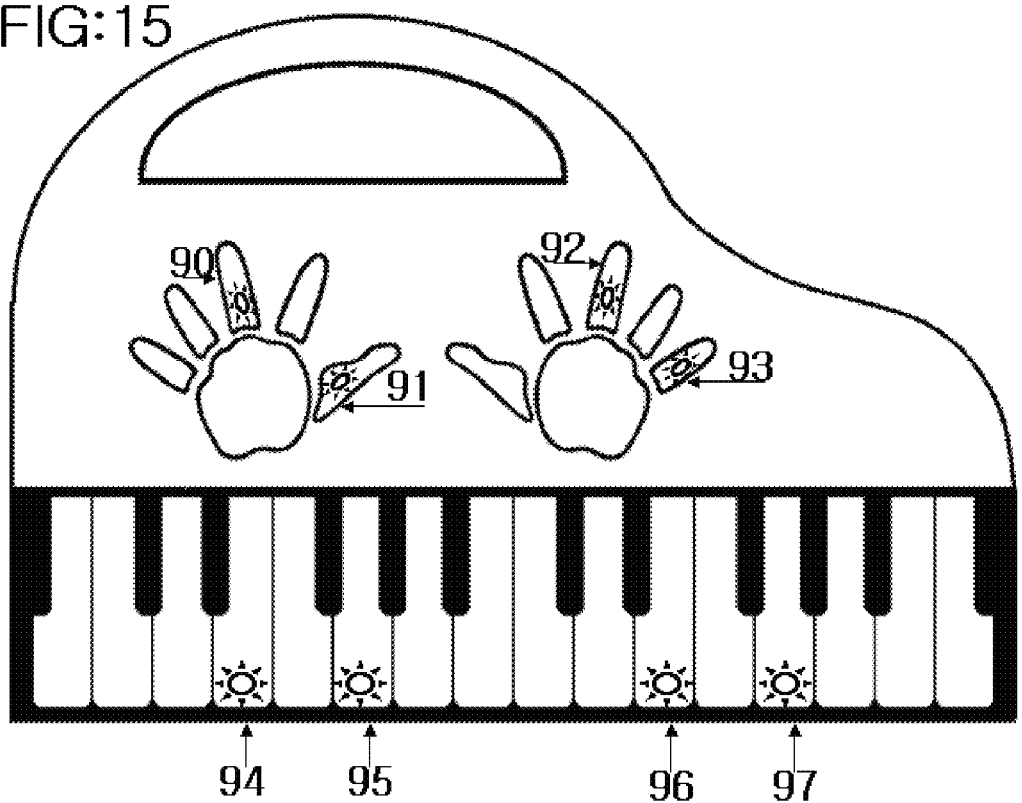
FIG:15
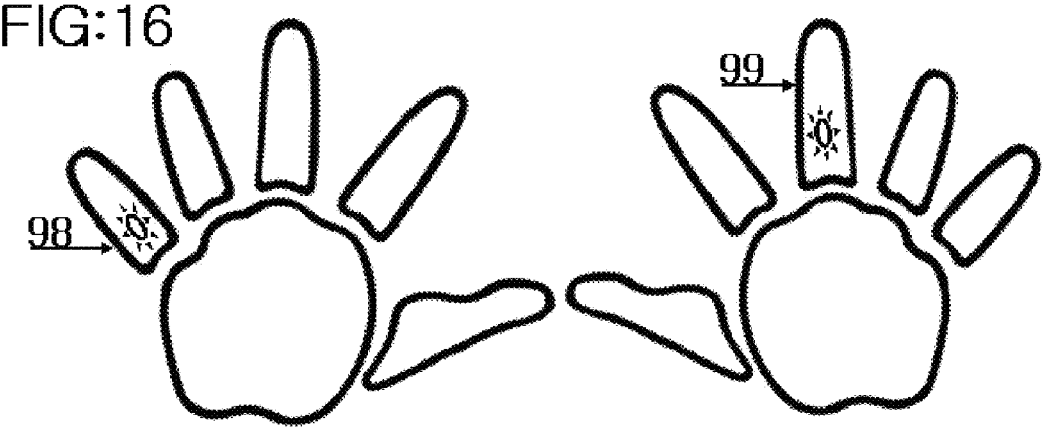
FIG:16

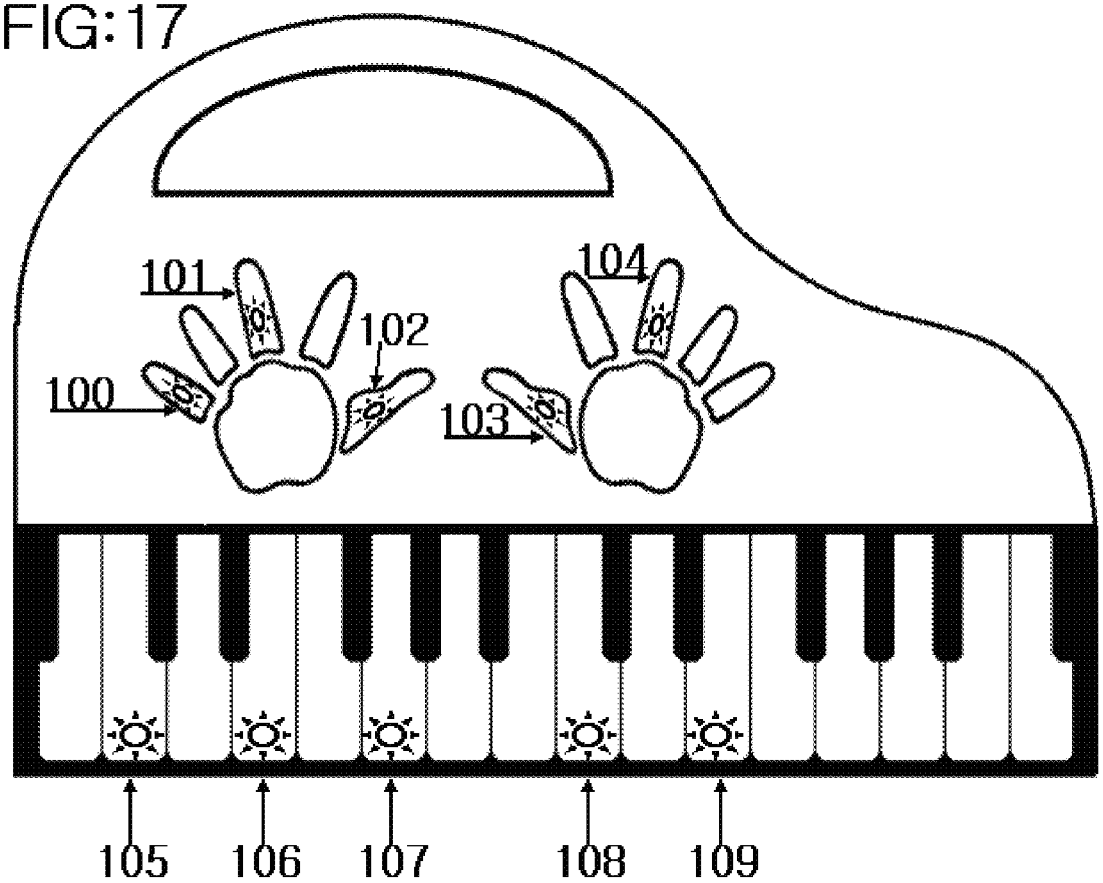
FIG:17
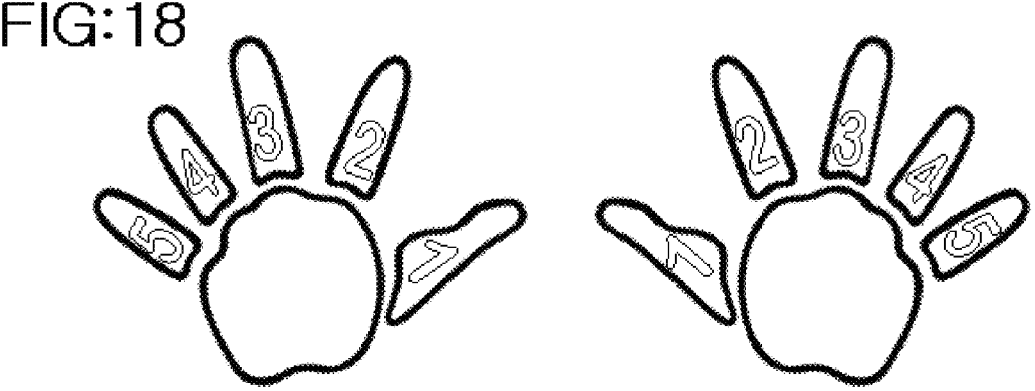
FIG:18

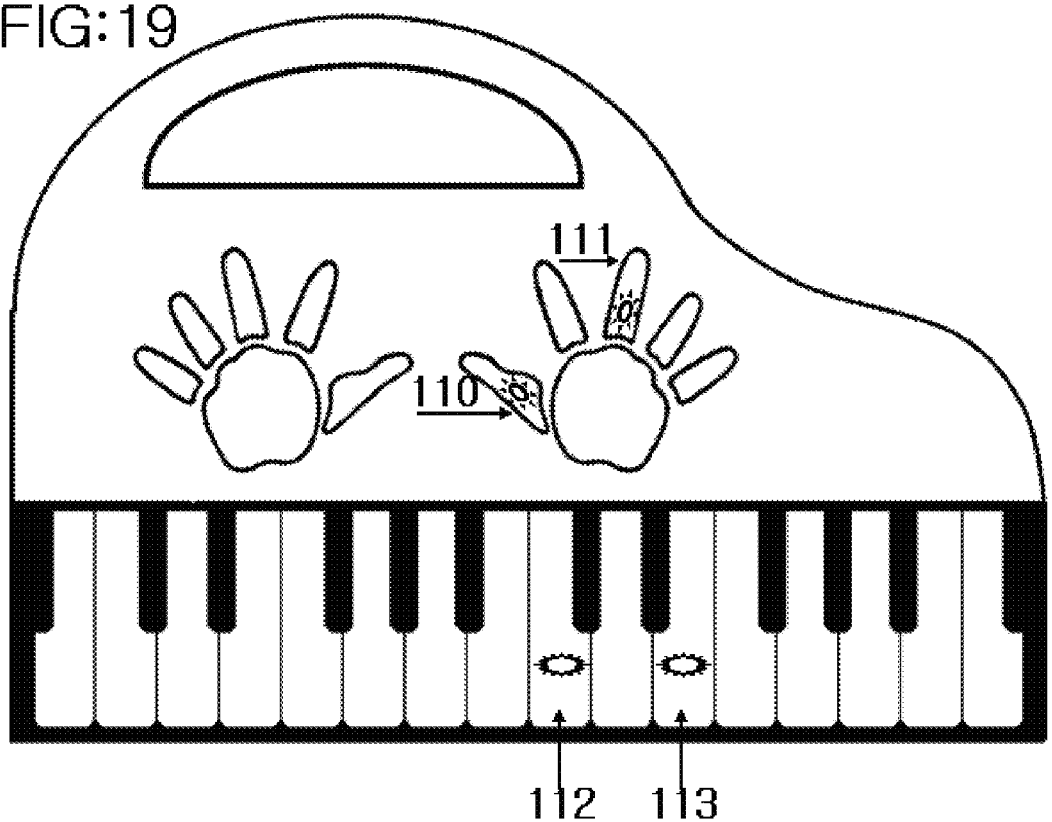
FIG:19
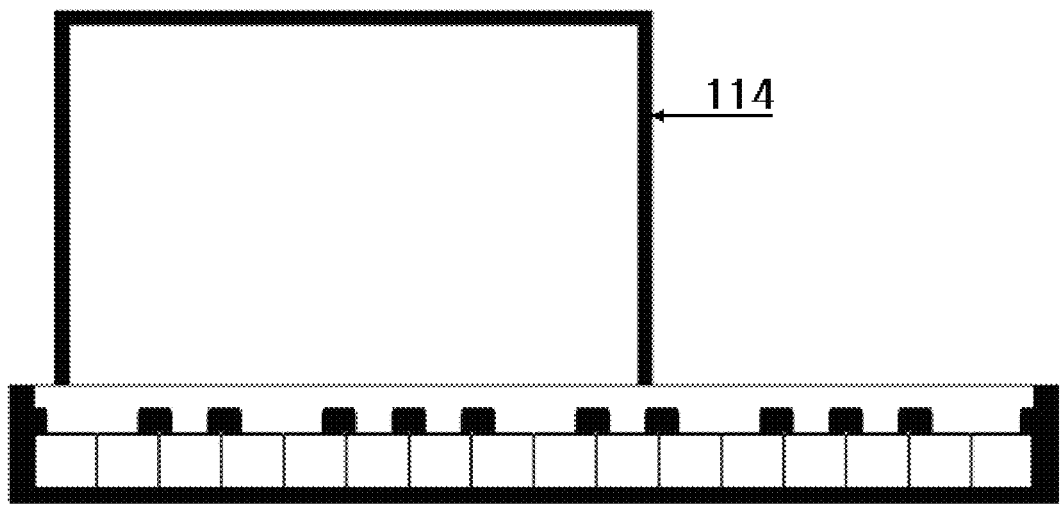
FIG:20

FIG:21
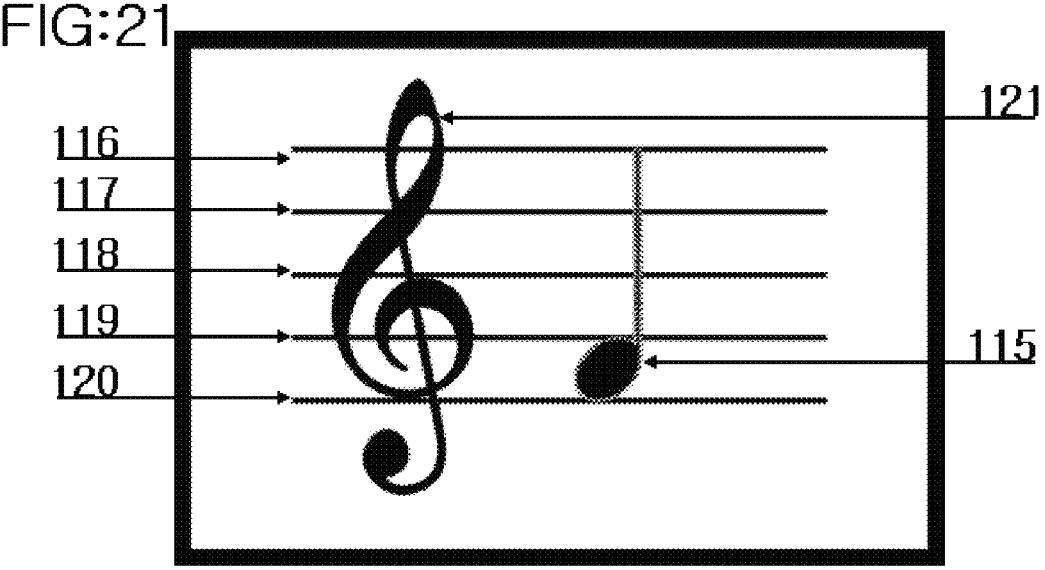
FIG:22
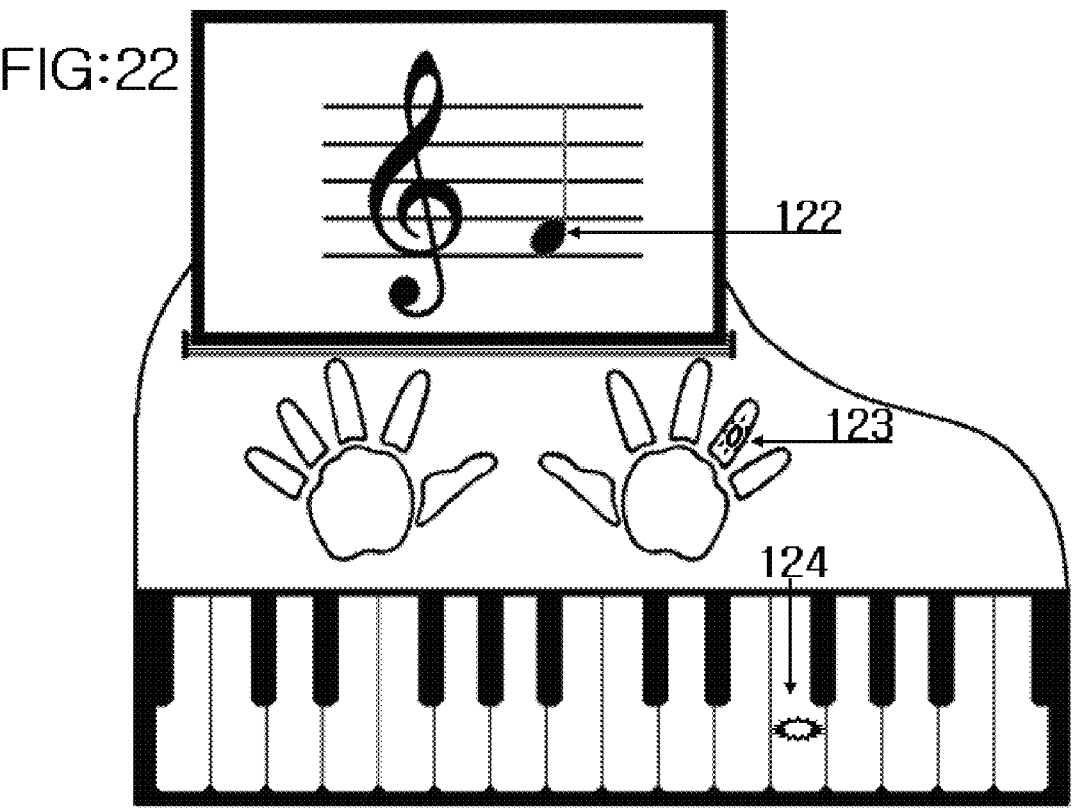

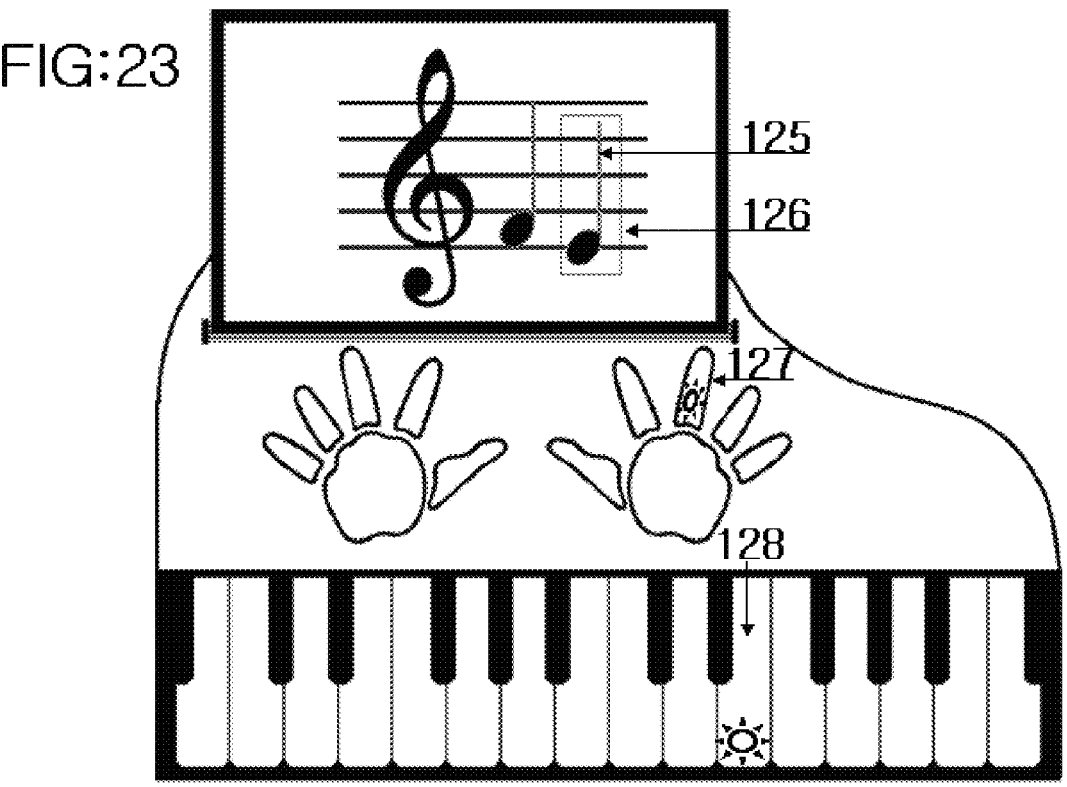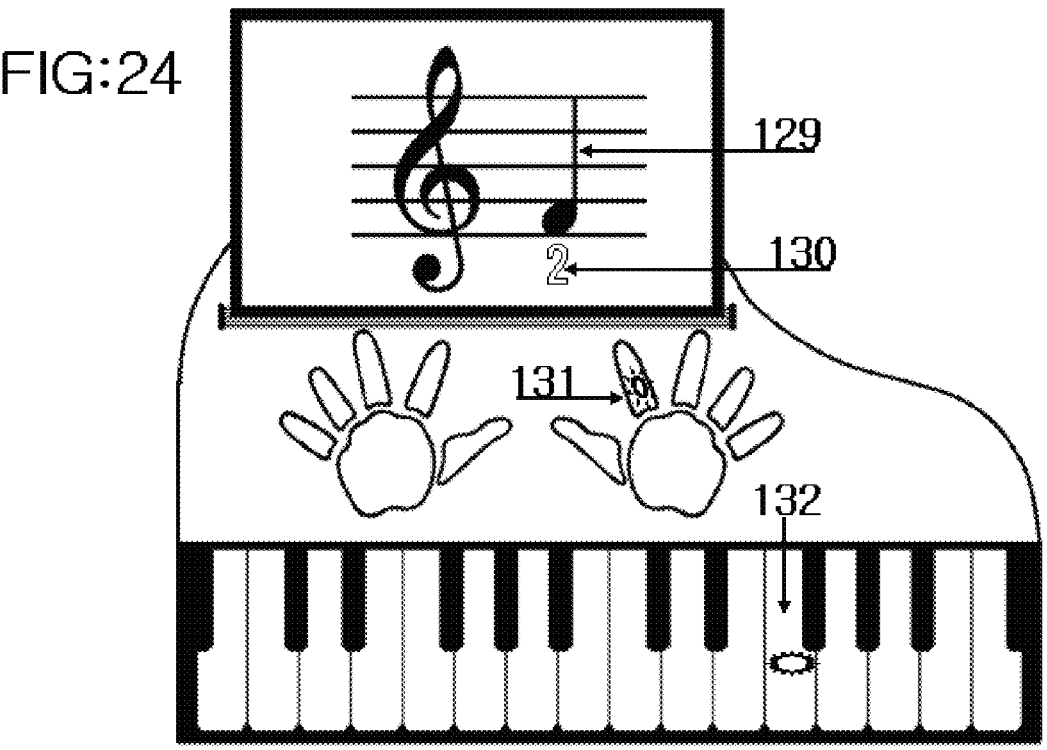

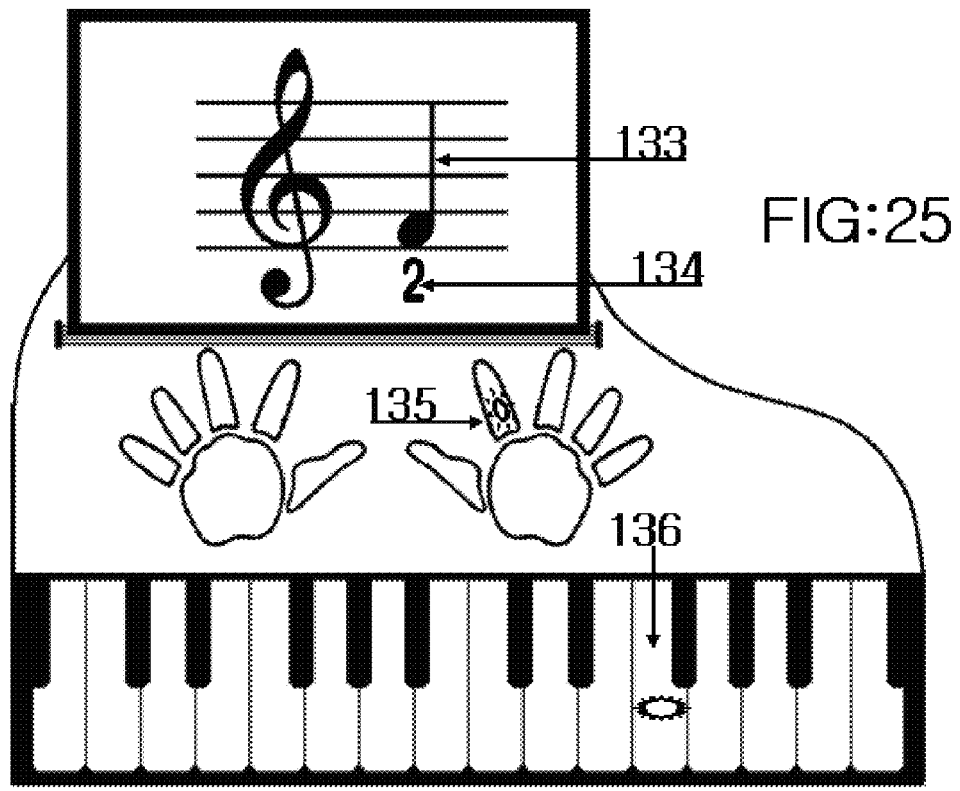
FIG:25
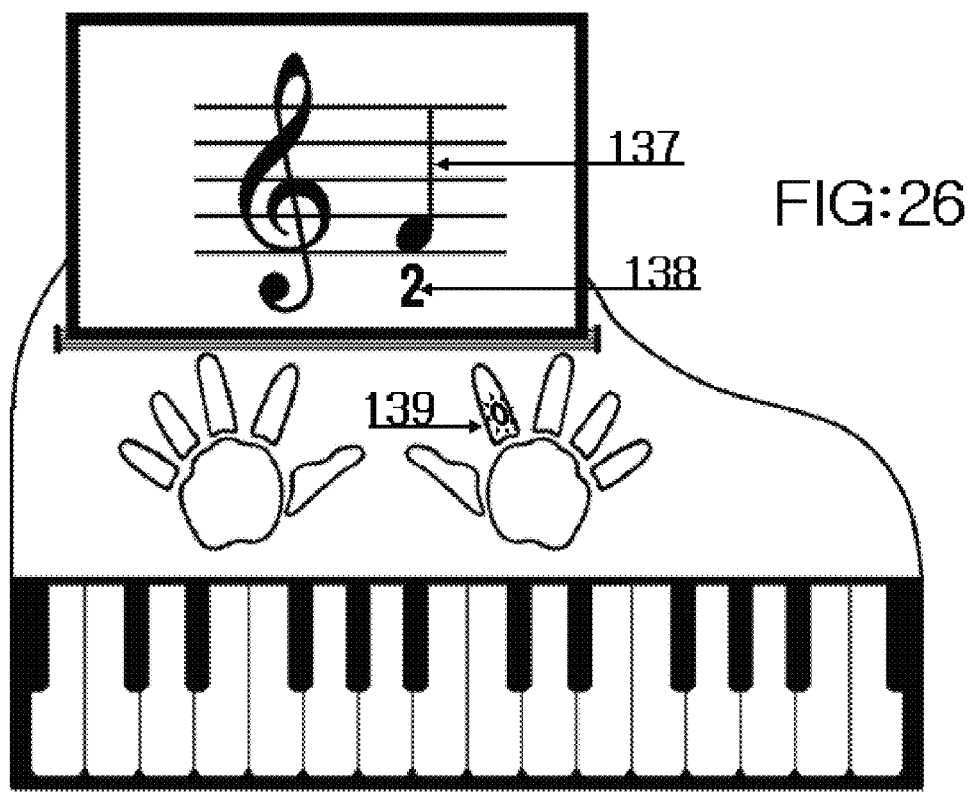
FIG:26

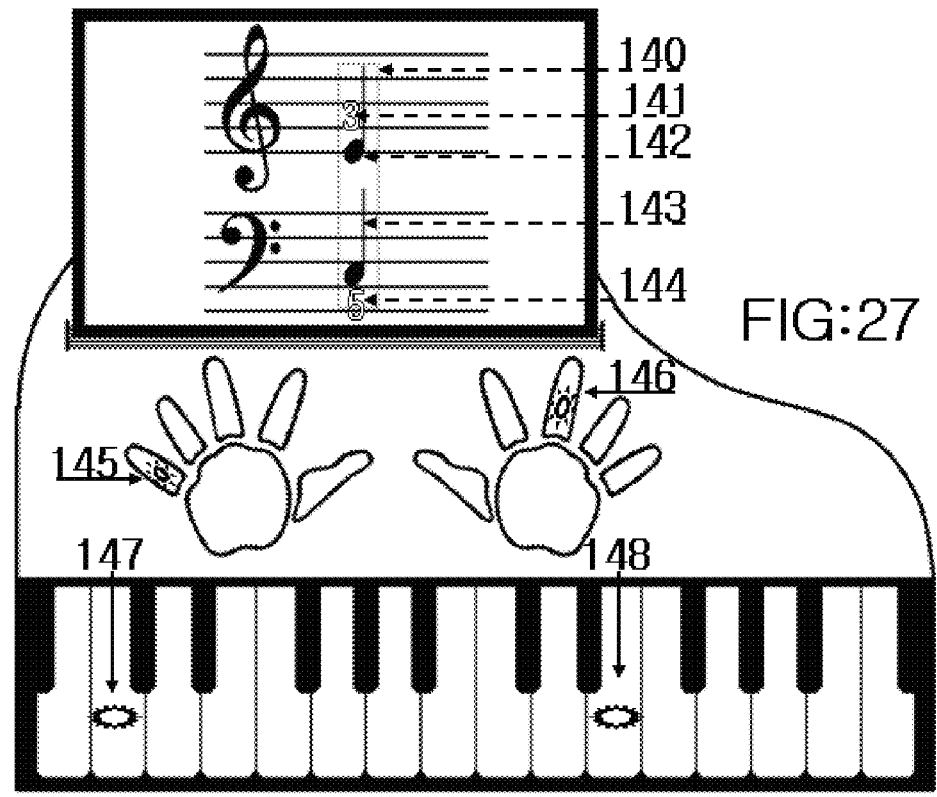
FIG:27
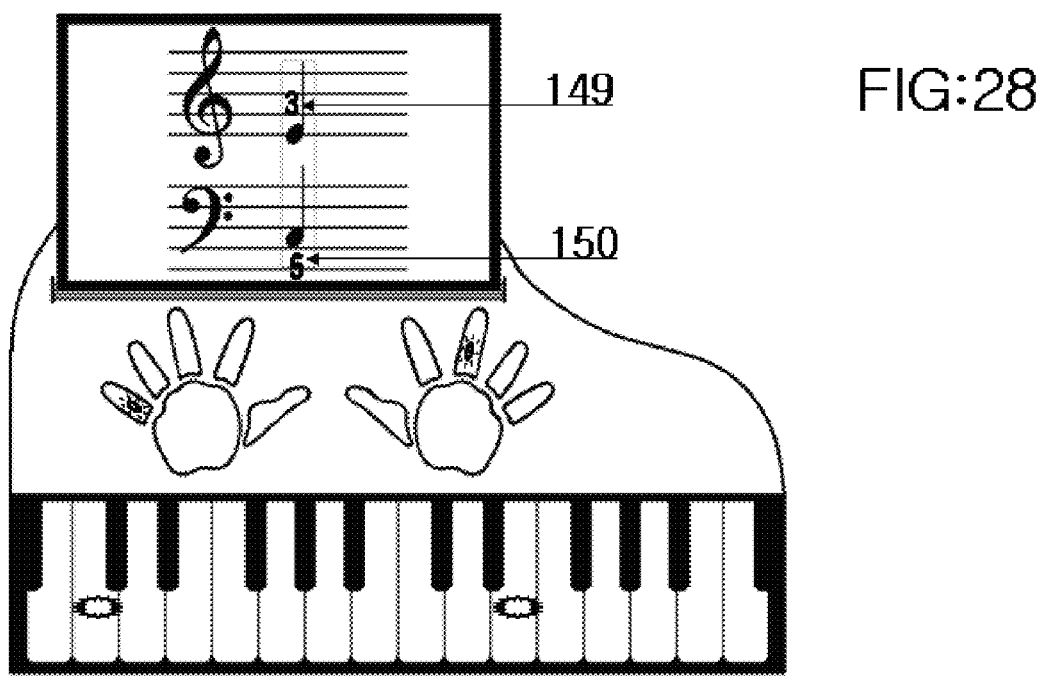
FIG:28

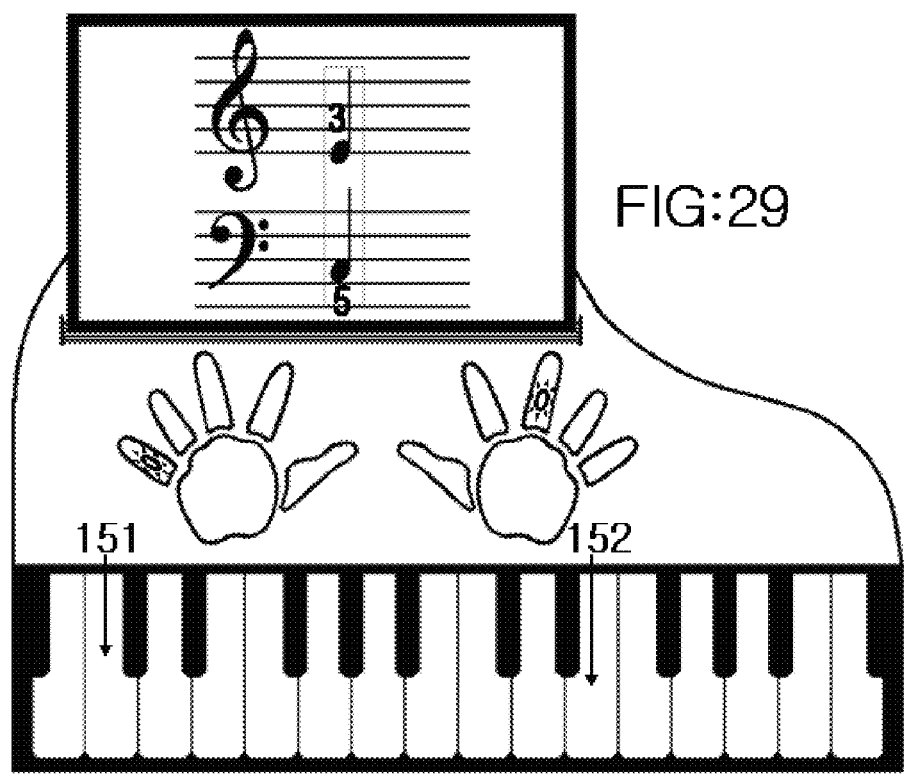

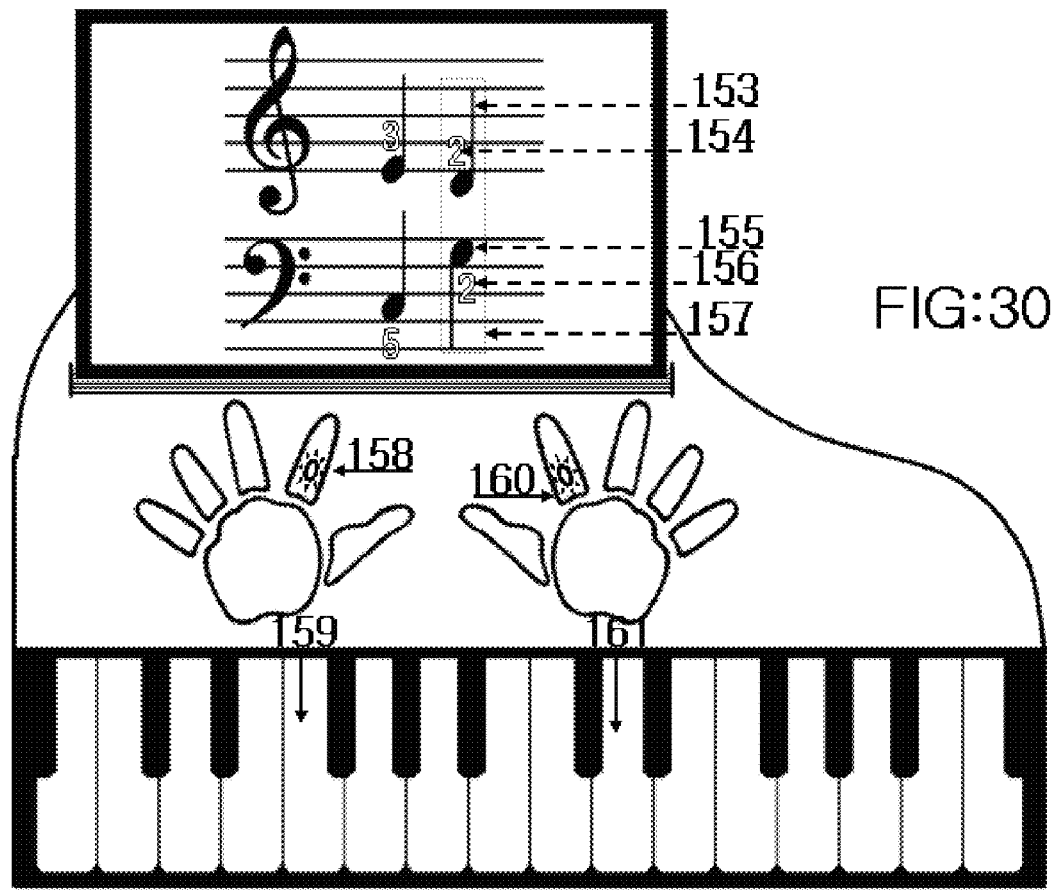
FIG:30
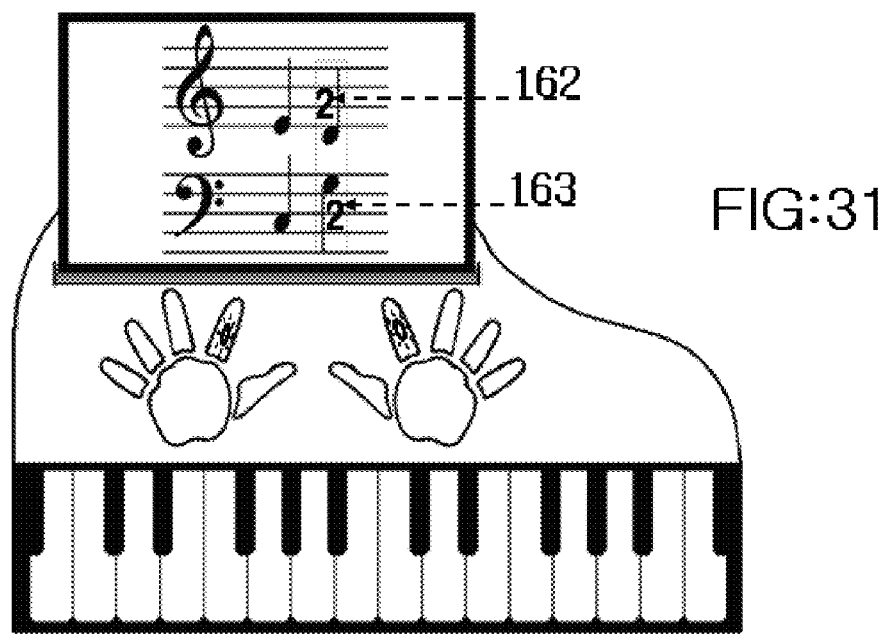
FIG:31

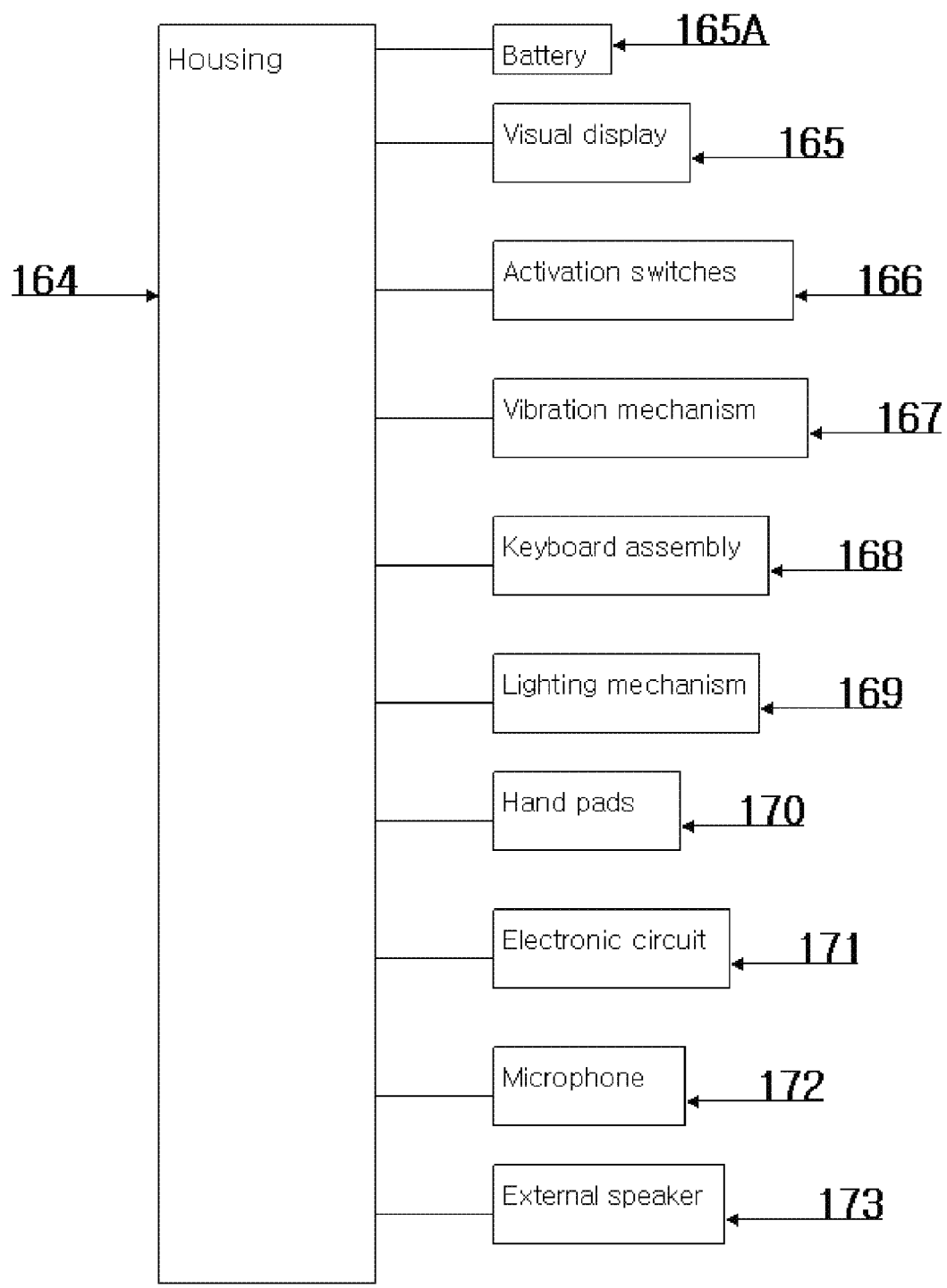
FIG:32

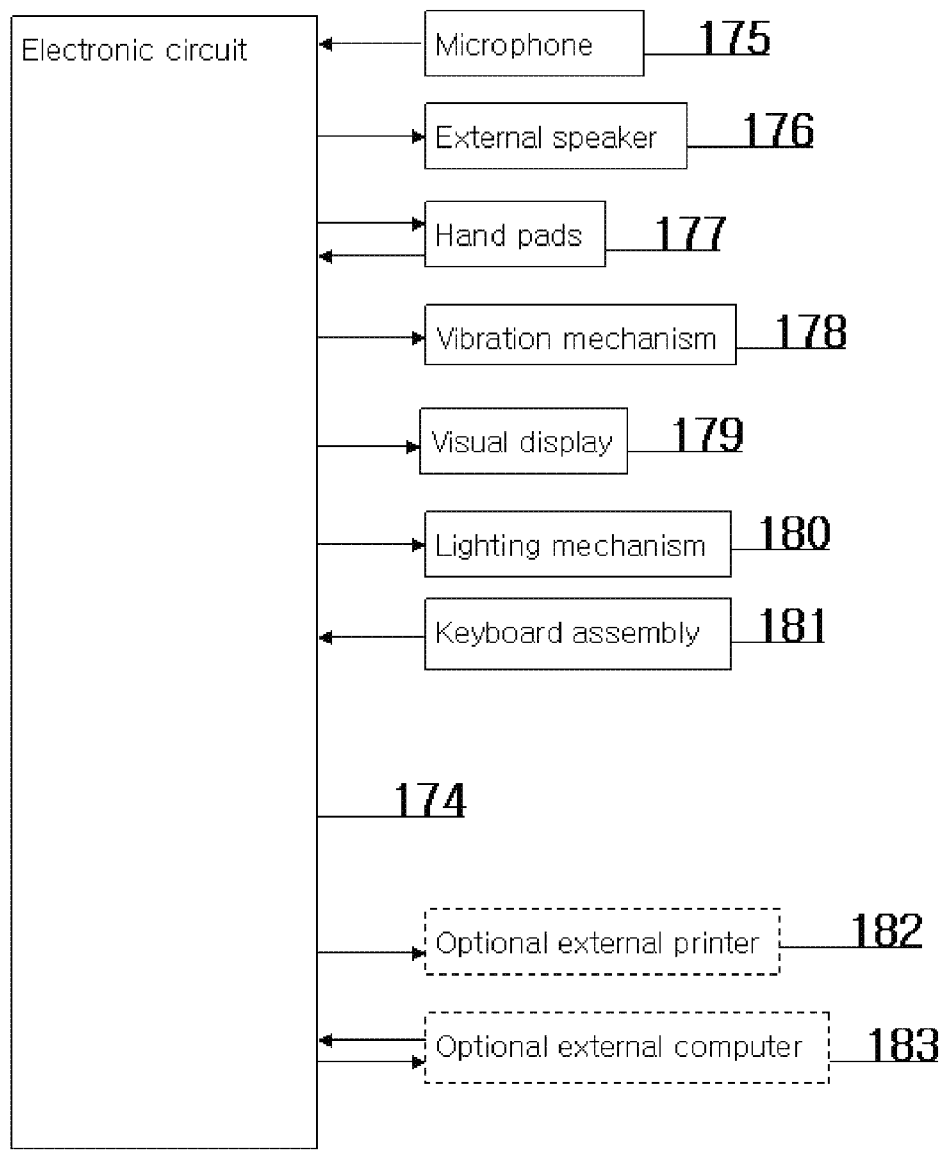
FIG:33

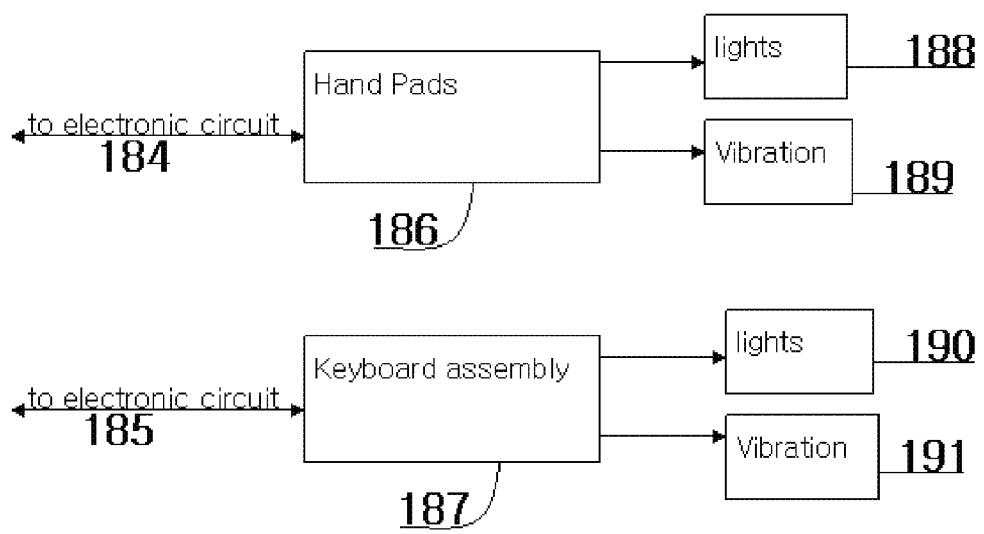

ELECTRONIC CIRCUIT DRIVEN, INTER-ACTIVE, PLURAL SENSORY STIMULI APPARATUS AND COMPREHENSIVE METHOD TO TEACH, WITH NO INSTRUCTOR PRESENT, BEGINNERS AS YOUNG AS TWO YEARS OLD TO PLAY A PIANO/KEYBOARD TYPE MUSICAL INSTRUMENT AND TO READ AND CORRECTLY RESPOND TO STANDARD MUSIC NOTATION FOR SAID INSTRUMENTS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, TABLE, OR COMPUTER PROGRAM LISTING COMPACT DISC APPENDIX

Not Applicable

BACKGROUND OF THE INVENTION

This invention relates generally to a system and method of instruction for teaching with no instructor present, a user as young as two years old, to play a musical instrument with keys such as a piano or keyboard as well as reading and responding correctly to standard music notation for keyboarded instruments. It specifically relates to a system and method of instruction for teaching a beginning student, even a two year old pre-reading student, using audio, visual, and tactile sensory stimuli; beginning with the basics of depressing fingers one at a time, then continuing with instruction for depressing one key at a time using a specified finger, playing sequences on finger shapes or keys, teaching the user to play with both hands separately and together in parallel or contrary motion, and teaching the user to read and respond correctly to standard music notation. As the user progresses in proficiency with these sensory stimuli used singly or in tandem, sensory help is gradually withdrawn, enabling user to play any piano or keyboard instrument as well as read and correctly respond to standard music notation without these additional sensory helps.

In recent years there has been an increased awareness of the great benefits of very early applied music instruction, here "applied" meaning actually learning to play an instrument. Few teachers teach the very young, particularly children as young as two years old, how to play the piano. Very young children, that is, children who are in the process of learning language, have at this point in their development great but narrow learning abilities: highly discerning hearing and memory capability coupled with high motivation. Any truly effective teaching done with this age child must parallel language learning and properly make use of these abilities.

Young children this age tend to relate more heavily to one of the forms of learning-tactile, visual, and aural—thereby making it necessary to incorporate all three forms with every action of the teaching process that targets young children. In addition, every step in the learning process must be clearly related in the mind of the user to the previous step, for young children cannot compensate for skipped steps. This manner of teaching with a meticulous step-by-step approach can be overwhelming to an instructor accustomed to teaching an older, reading student. Heretofore, parents of the very young child have been faced with the challenge of finding and affording a competent teacher as well as providing extensive coaching for their child to receive the benefits of early piano. This electronic circuit driven apparatus is able to provide necessary teaching repetition, combination of sensory stimuli, meticulous attention to each step of the process and monitoring of progress; thereby enabling apparatus to proceed with step-by-step instruction that is individually appropriate for the user provided at a small fraction of the cost of that for teachers and coaches.

It has been stated in some prior art, that young children have a short attention span. Young children may be distracted easily; however, a young child immersed in an activity of great interest to that young child, will focus on that activity for long periods of time, on occasion for hours. This apparatus is purposely designed to have great visual appeal, as well as appropriate and sensory stimulating tactile, visual, and audio prompts incorporated in every action.

Prior art assumes prior training or development of fine motor skills and finger dexterity which are associated with older children. With this apparatus, it is not required that the young user have previously trained fine motor skills and finger dexterity to start learning how to play a keyboarded instrument. The beginning skill of this apparatus requires only that the user place his/her hands on top of the obvious illuminated finger and palm shapes representing two child size handprints and depressing or pushing down on the illuminated/vibrating shapes for one of these hands. The next skill level is ability to move each finger independently. With repetition and practice, increased proficiency will follow, which leads to another aspect of teaching very young children. Young children accept and enjoy repetitious learning activities, but pushing them beyond their present learning level limits, hinders or stops progress. This apparatus will allow children to repeat activities as many times as necessary. New activities are introduced carefully in conjunction with already mastered skills in order to keep the child's interest and motivation.

In an effort to stay within the realm of capability of the very young child this apparatus relies heavily on multiple sensory stimuli: verbal instruction coupled with audio sounds, coupled with color matching, coupled with tactile, vibrating stimulus. This apparatus uses these sensory stimuli to teach children which fingers to use, what keys to play and how to read music notation, enabling the very young child to learn to play a keyboarded instrument using all fingers of both hands and being able to read standard music notation.

Many devices indicated in prior art have sought to provide instruction for the beginner piano student. None of the prior art, however, is appropriate for the user as young as two years old. None of the prior art offers a comprehensive method of teaching piano and using standard notation with the use of multisensory stimuli. Most address only one part of the complex process needed to teach the user to play the piano/keyboard. Most address a user with prior experience and/or instruction and much older than two years old. One, U.S. Pat. No. 5,841,051 to Segan, provides a device for teaching young beginner students the correlation between the user's finger and standard piano fingering numbers. It, however, uses the right-hand only and lights which are all the same color to indicate a finger or a key. These lights, however, do not color-code the proper finger to the proper key or keys. It is assumed that a child using this particular device already knows numbers 1 through 5 and the user of this device must be able to respond to audio, verbal finger number prompts in order to use the proper finger on the proper key. This device does show music notation on the cards inserted onto apparatus but does not teach the user how to read said notation.

Many devices indicate proper keys to play or which hand to use by utilizing lights. U.S. Pat. No. 5,557,055 by Breitweiser, Jr., use red and green lights to indicate right and left hands. This device also displays on the surface of the keys a finger or other symbolic form of identifying a finger. The user of this device would need prior knowledge of right and left hands and be able to discern from a symbol which finger is to be used. My apparatus does not require that the user know right hand from left-hand or be able to tell from a symbol which finger is indicated. My apparatus begins at the much more elementary level of learning and incorporates the combination of multi sensory stimuli (audio, visual, vibrating tactile).

There are many keyboards in the marketplace that utilize illuminated keys. However, all these devices illuminate the keys only to indicate the proper key to be used by the user. None of these devices have an obvious way to indicate which finger should be used for a given key. My apparatus uses illuminated and vibrating keys to give the user multi sensory stimuli.

Many keyboards are enabled to show the user how to play a tune by the sequential illumination of keys such as in U.S. Pat. No. 6,037,534 by Yasutoshi, et al., or a display indicating keys to be depressed. None of these keyboards activate any type of tactile stimulus as an added indicator to the user which key to activate such as is in my apparatus. None have the obvious visual or tactile correlation between key and appropriate finger to be used by user as in my apparatus.

Many devices use wearable devices such as a glove to guide the user to depress keys with certain fingers. No such wearable device is appropriate for the young learner.

Color coding is used to help in the reading of notation. U.S. Pat. No. 6,284,961 by Kimmel, codes keys to color coded musical notes. U.S. Pat. No. 7,148,414 by Kestenbaum et al., also has a system for color coding notation for ease in reading notes using seven colors for the seven tones of a musical scale. Corresponding colors are applied to keys by means of adhesive labels or color directly applied to the keys. The color-coded keys are directly coded to color-coded notes in these patents. The present invention color codes keys to fingering as well as color coding the notation to fingering. Five colors total are used to indicate the five fingers of each hand. In the beginning activities of the present invention it may appear that the color coding is a color coding of the keys. There are five keys illuminated in the same colors as the five finger shapes of the right-hand. There are however six keys illuminated in the same colors as the five finger shape of the left-hand. Two keys are illuminated in the same color as one of the finger shape of the left-hand. Later, when the color-coded keys of the present invention all become illuminated in the same color rather than the different colors, the multicolored finger shapes of the hands embodied in the apparatus continue to be used to prompt the user to use his/her finger that corresponds to an illuminated finger shape. This apparatus is multisensory, using verbal prompts and properly pitched sound coupled with both visual and additional tactile stimuli to demonstrate the proper finger for a particular key.

Rhythm is an integral part of learning to play the piano/keyboard. There are many games and programs that teach children rhythm. U.S. Pat. No. 7,174,510 by Salter, indicates rhythm to children by having them match rhythms incorporated into their audiovisual interactive games. The present invention continually exposes children to steady rhythm throughout every activity not only by examples they hear, but also by the meticulously steady pace of verbal prompts. In addition, however, the present invention provides audio, visual and tactile sensory stimuli to further indicate rhythm: indicating rhythm with properly pitched sound activated in rhythm, verbal instruction spoken in rhythm, with visual rhythmic on and off sequence of lights on the finger shape or keys, and with the "feel" of the rhythm utilizing on and off vibration stimulus. The users of the present invention simultaneously experience hearing, seeing and feeling proper rhythm.

All of the above referenced patents address some of the myriad aspects of teaching a person to play the piano/keyboard properly as well as reading notation. Most are intended to be used with more advanced students or students with teacher assistance. None are able to present their instruction in a manner in which a very young child (that is a child as young as two years old) would be able to learn to play a keyboard instrument independently with only the use of an apparatus, as well as learning to read and respond correctly to standard notation, again with the use only of an apparatus. None are comprehensive, that is, teaching the user from the basics of moving each finger independently to reading and responding correctly to notation. None of the above referenced patents use multiple sensory stimuli, including tactile stimulus, to aid in the instruction process. The present invention incorporates the three basic types of learning—aural, visual, and tactile—in every action of every activity until the user is able to respond first without one, and finally without all of them, thereby being able to play on any piano or keyboard instrument without a helpful sensory aid and to read and respond correctly to standard music notation.

BRIEF SUMMARY OF THE INVENTION

The inadequacies of prior art are addressed by this apparatus. This is a comprehensive, complex teaching apparatus driven by an electronic circuit operated program. It requires no instructional supervision, it requires no prior knowledge of playing a keyboard musical instrument; it requires no ability to read notation; it begins at the most elementary level, enabling a beginner with no prior experience to learn to play a piano/keyboard; it utilizes multi-sensory stimuli not found in any prior art; and allows the user to move from the very elementary level of learning, moving one finger at a time, to the ability to use all fingers and to accurately read and respond to standard music notation, thereby establishing the basis of lifelong musical skills.

The preferred embodiment features a durable, suitable housing with an incorporated keyboard and incorporated child sized right-hand and left-hand with defined shapes for each individual finger and palm. The finger and palm shaped components to be made wholly or in part of colored plastic or other suitable material that can function as a transparent colored lens. The keyboard apparatus has a nominal number of 16 white keys with corresponding black keys, each key of which to be made wholly or in part of a suitable material that can function as a lens allowing light to pass through in order to illuminate key. Also incorporated into this apparatus, a mechanism capable of effecting a vibration effect any one or more of these shapes and keys singly or in plurality. An attachable or integrated flat display screen such as an LCD flat-panel monitor associated with apparatus provides static or dynamic audiovisual display capabilities. This apparatus is electronic circuit driven with suitable input/output capabilities to generate speech, to sense the activation of an input from the user, to determine correct or incorrect activation input by user, to generate sensory output to indicate correct or incorrect actions by user, and to monitor input of user to determine stimulus output for next appropriate action to the user based on consistent accuracy or inaccuracy of user and response time of user.

Each of the defined shapes of the hands has a light, such as LED, positioned underneath, able to illuminate shapes singly or jointly when activated. Right hand fingers and left-hand fingers are color-coded to each other. The vibration mechanism is able to activate a vibration effect associated with each finger shape or shapes singly or jointly. A set of colored lights or colored lenses are positioned underneath a minimum of eleven white keys to enable the keys to be illuminated in the same five colors as the finger shapes, one particular color per key. An additional set of lights which are all uniform color, one light under each key, enable keys of apparatus to be illuminated singly or jointly. An electronic circuit controls the operation of the electronic learning device utilizing verbal prompts to the user, different colors in the hands and/or keys, the vibrating mechanism, sound accurately pitched to 440A, and displays on the screen, in order to instruct the user how to play a musical keyboard instrument and read standard music notation.

This electronic apparatus has several functions, each with multiple skill levels. In the beginning, activities pass back and forth from the finger/hand shapes on this apparatus to the keys of this apparatus. The user learns to use the individual fingers of each hand one by one, then progresses to the ability to use a finger of one hand simultaneously with a finger of the other hand in parallel or contrary motion. Actions are presented with meticulously steady rhythm to instill steady rhythm to user. Additional rhythm activities incorporate sensory sound, visual and tactile stimuli. Each activity must reach a predetermined mastery skill level before apparatus continues to next level of instruction. User's correct responses to any action are rewarded with happy sounds of approval. User is given positive encouragement to repeat and correct incorrect actions.

Instruction begins with audio, visual, and tactile sensory prompts. As user progresses, the helpful sensory prompts are gradually decreased until user is able to respond accurately without any additional sensory helps. Instruction begins by prompting the user to place his/her hand onto the palm and finger shapes, matching each finger to the corresponding finger shape. User is then instructed to depress a particular illuminated, vibrating finger shape with user's corresponding finger. When user responds correctly to this action, user is prompted to move his/her hand to the keyboard and depress an illuminated/vibrating key with user's finger that corresponds to illumination of the corresponding finger shape as well as the illumination on the key. Instruction progresses from user's ability to respond correctly to the instruction for one finger on the finger shape and key utilizing each finger of both hands, to sequences of fingers on the finger shapes and keys. Every action includes two or more of the sensory instruction or sensory stimuli: verbal instruction, properly pitched sound, visual color and tactile vibration. When the user progresses to play sequences or songs utilizing the second set of lights which are all the same color to illuminate the keys, the apparatus continues in its instruction by teaching the user how to read music notation. This instruction, as with all the other functions of this apparatus, utilizes sensory stimuli: verbal instruction, properly pitched sound, visual color and tactile vibration, thereby eliminating the need for the user to be able to comprehend written letters or words in able to learn to read music notation. As the user gains proficiency, the sensory helps are gradually withdrawn, making it possible for the user to play on any piano/keyboard without the multi-sensory instructional aides. The user is always recognized for correct responses and gently encouraged to repeat an activity in order to correct errors.

Every activity is named as a game, i.e. "Flashing Fingers", "I Play You Play". This apparatus has a function which allows the user to choose an activity. Since the electronic circuit operating this apparatus is able to monitor progress, the chosen activity will always be at the level of the user and incorporate the suitable sensory helps.

As each new function is added, actions are built on skills learned in beginning activities. This allows user to proceed with new, more difficult functions combined with already familiar actions, functions and activities and to proceed with instruction limited to one new step at a time.

This apparatus and method makes it possible for the user to learn to play the piano/keyboard in a confident, non-intimidating way, independently without the need for instructional supervision. This apparatus may be used by a very young user, one as young as two years old. The instruction however, is also suitable and appropriate for an older user. Methods of instruction appropriate for young learners can be used for older learners, but methods of instruction appropriate for older, reading learners cannot be used for young learners. Instruction in this apparatus is steadily progressive to keep the user's interest.

Additional songs and activities may be downloaded to this apparatus or added with a plug-in module.

This apparatus may be operated with standard batteries or a battery or batteries capable of being recharged.

The functionality of this apparatus can be independent of the hardware as described in a similar but with reduced functionality in any of the popular gaming systems or computer systems with suitable tactile and sensory capabilities.

BRIEF DESCRIPTION OF THE SEVERAL VIEWS OF THE DRAWING

FIG. 3: hand shapes
items 45-49: defined left-hand finger shapes
items 50-54: defined the right-hand finger shapes
item 44: defined shape for left palm
item 55: defined shape her right palm
FIG. 4: apparatus shown with display screen attached
item 56: display screen
FIG. 5: control buttons with sample indicia
item 57: teaching button
item 58: song button
item 59: choose activity button
item 60: repeat button
item 61: free play button
item 62: on-off button
FIG. 6: finger and palm shapes with illumination indicia
items 64 and 69: color number one items 65 and 70: color number two
items 66 and 71: color number three
items 67 and 72: color number four
items 68 and 73: color number five
item 63: color number six
item 74: color number seven
FIG. 7: corresponding illumination indicia
items 75 and 76: finger shape and key illuminated with color number four
FIG. 8: side view of apparatus
item 77: attached screen in closed position
item 78: receptacle for charging battery
item 79: receptacle for optional headset
item 80: USB port
FIG. 9: side view of apparatus
item 78: attached display screen in open position
FIG. 10: side view of apparatus
item 79: shaped lid in closed position
FIG. 11: side view of apparatus
item 80: shaped lid with integrated display screen in open position
FIG. 12: top view of apparatus
item 81: display screen
item 82: shaped lid
FIG. 13: top view of apparatus
items 83 and 85: lighting indicia for color number two
items 84 and 86: lighting indicia for color number three
FIG. 14: top view of apparatus
items 87, 88, 89, and 90: lighting indicia for color number five
FIG. 15: top view of apparatus
items 90, 92, 94 and 96: lighting indicia for color number three
items 91, 95, 93 and 97: lighting indicia for color number five
FIG. 16: hand shapes with illumination indicia
item 98: indicated illumination for color number one
item 99: indicated illumination for color number three
FIG. 17: top view of apparatus 14
items 100, 105, 103, and 108: lighting indicia in color number one
items 101, 106, 104 and 109: lighting indicia in color number three
item 102: indicated illumination for color number five
FIG. 18: defined finger shapes with standard piano fingering numbers indicated
FIG. 19: top view of apparatus
items 110 and 112: lighting indicia for color number one
items 111 and 113: lighting indicia for color number three
FIG. 20: front view of apparatus
item 114: display screen in open position
FIG. 21: display screen
items 116, 117, 118, 119, and 120: displayed music staff lines
item 121: displayed treble clef symbol
item 115: displayed music note outlined in a contrasting color
FIG. 22: view of apparatus with display screen
item 122: music note with indicia indicating contrasting color outline in color number four
item 123: finger shapes with indicated illumination in color number four
item 124: key with indicated illumination in color number four
FIG. 23: view of apparatus with display screen
item 125: music note with indicated contrasting color outline in color number three
item 127: finger shape with indicated illumination in color number three
item 128: key with indicated illumination in color number three
FIG. 24: view of apparatus with display screen
item 129: music note
item 130: fingering number under note in color number two
item 131: finger shape with indicated illumination in color number two
item 132: key with indicated illumination which is not color-coded to fingering number or finger shape
FIG. 25: view of apparatus with display screen
item 133: music note
item 134: fingering number
item 135: finger shape with indicated illumination in color number two
item 136: key with indicated illumination which is not color-coded to finger shape
FIG. 26: view of apparatus with display screen
item 137: music note
item 138: fingering number
item 139: finger shape with indicated illumination in color number two
FIG. 27: view of apparatus with display screen
item 140: indicia to indicate present activity
item 141: fingering number with indicated illumination and color number three
item 142: music note in treble clef with no indicated illumination
item 143: music note in bass clef with no indicated illumination
item 144: fingering number with indicated illumination in color number one
item 145: finger shape with indicated illumination in color number one
item 146: finger shape with indicated illumination in color number three
item 147: key with indicated illumination in color number one
item 148: key with indicated illumination and color number three
FIG. 28: view of apparatus with display screen
items 149 and 150: standard fingering numbers with no color coding
FIG. 29: view of apparatus with display screen
items 151 and 152: keys of apparatus shown with no illumination
FIG. 30: view of apparatus with display screen
item 153: note shown on treble staff
item 154: fingering with indicated illumination in color number two
item 155: note shown on-base staff
item 156: fingering with indicated illumination in color number four
item 157: indicia indicating present action
item 158: finger shape with indicated illumination in color number four
items 159 and 161: keys shown with no indicated illumination
item 160: finger shape with indicated illumination and color number two
FIG. 31: view of apparatus with display screen
items 162 and 163: fingering shown with no indicated color coding
FIG. 32: schematic drawing of electronic circuit and associated assemblies
FIG. 33: schematic drawing of housing with associated components
FIG. 34: schematic drawing of assemblies and sub-assemblies item 186: hand pads assembly items 188 and 189: light and vibration sub-assemblies item 187: keyboard assembly items 190 and 191: light and vibration sub-assemblies

DETAILED DESCRIPTION OF THE INVENTION

Figure 1:
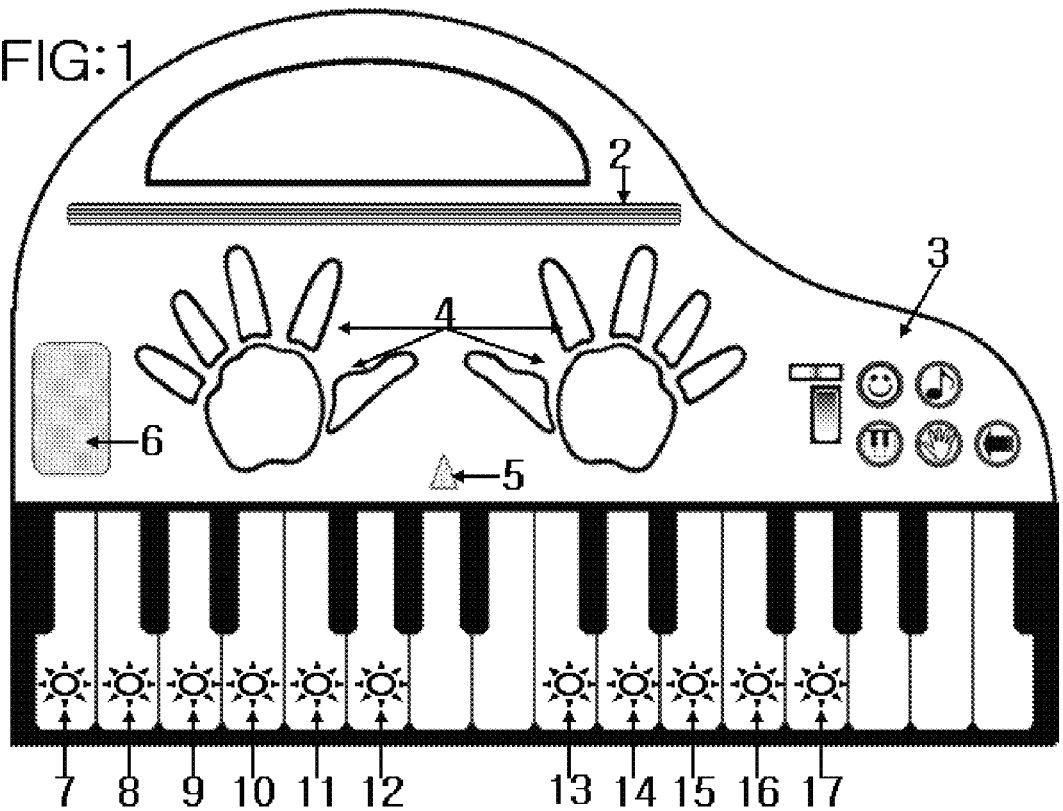
FIG. 1: top view drawing of apparatus
item 2: receptacle for display screen
item 3: control buttons
item 4: hand shapes
item 5: microphone
item 6: speaker
items 7-17: indicia for multicolor lighting

The preferred embodiment of this invention is a comprehensive electronic learning device for the instruction of playing a keyboard musical instrument and reading and responding correctly to musical notation, shaped similarly to grand piano or other suitable shape formed of a durable plastic or other suitable material capable of encompassing a piano type key mechanism with nominal number of white keys and black keys, as illustrated with 16 white keys and 10 black keys in FIG. 1, of which 11 designated white keys each include a specifically colored light which can be selectively illuminated, FIG. 1, items 7-17. This invention further embodies an additional second set of lights which are of uniform color (hereafter referred to as "white" color) in every key of apparatus that can be selectively illuminated, FIG. 2, items 18-43. Keys of said invention to be made entirely or partially of material that allows enough light to pass through in order to illuminate entire or part of each individual key. Keys of apparatus, FIG. 2, items 18-43, may also be caused to selectively vibrate singly or jointly. The apparatus also having shapes embodied into housing configured to represent right and left hands, FIG. 3, with defined finger and palm shapes, FIG. 3, items 44-55. Each defined finger and palm shape to be formed of a suitable material wholly or partly that can function as a transparent colored lens, FIG. 3. Each shape can be selectively illuminated, FIG. 6, items 63-74, and each shape also serves as an individual touch sensitive mechanism capable of being activated by pressure. Each shape can be selectively activated singly or jointly simultaneously with sound, illumination, vibration, or a combination of these three sensory stimuli. This invention further includes a flat display screen for use in instruction, such as a LCD flat-panel monitor, either as an add-on accessory or incorporated into the housing, FIG. 4, item 56.

Speaker, FIG. 1, item 6, and microphone, FIG. 1, item 5, are embodied in housing of apparatus. Control buttons/switches are embodied in the housing, FIG. 1, item 3. Each button controls a function of apparatus and is shaped or indicated by indicia for user to represent its function. FIG. 5 depicts said control buttons. FIG. 5, item 62, depicts the on/off switch. FIG. 5, item 57, depicts the instructional switch. FIG. 5, item 58, button/switch depicts function of apparatus which performs all songs programmed into apparatus so user can listen to songs he/she has learned or will be learning. FIG. 5, item 61, button/switch allows user to activate keys without instructional prompts. FIG. 5, item 59, button/switch gives user a choice of activities. If user desires to play a particular activity, for example, "I Play You Play", user is instructed to push a particular finger shape to indicate choice. The FIG. 5, item 60 button/switch "backs up" or reverts to previous action. The FIG. 5, item 62A, depicts the volume control.

All functions of this interactive apparatus are controlled by an electronic circuit with suitable input/output capabilities to generate speech, to sense the activation of an input from the user, to determine correct or incorrect activation input by user, to generate sensory output to indicate correct or incorrect actions by user, and to monitor input of user to determine stimulus output for next appropriate action to the user based on consistent accuracy or inaccuracy of user and response time of user.

The electronic circuit monitors correct or incorrect input from user. When user activates an incorrect response to an action, user is given positive encouragement to repeat and correct incorrect actions. If response is incorrect a predetermined number of times as programmed into electronic circuit, activity reverts to previous activity. When user activates a correct response to a given action, user is rewarded with "happy sounds" of approval and instruction moves to next action.

The instruction given to the user by this apparatus is orderly and sequential. It is appropriate for very young children who speak, but may not yet have the ability to read. It is, however, also appropriate for a child capable of reading, or the beginning user of any age who wishes to learn to play a keyboard instrument. Due to sensory actions of apparatus, this apparatus is also appropriate for persons who are visual or hearing impaired.

This sequential instruction incorporates meticulous attention to every step in the process of learning. Instruction begins at the most basic level required for the rank beginner—utilizing visual, audio, and tactile sensory instruction—to prompt the user to move one finger at a time. This invention relies on matching same color to same color and matching the user's hand or hands to the hand and finger shapes embodied on the apparatus. Because some young users may not readily be able to match same color to same color, the added sensory stimulus, vibration, adds a tactile indication for the user. The vibration aids the user in eye-hand development with its additional tactile help in addition to color when user is required to activate a finger shape or key with a particular finger.

Even though young children are generally very interested in learning to play the piano or keyboard, the learning process must be motivational throughout all the levels of instruction. When this apparatus is activated by user depressing the "On" button, the user is treated to a "light and sound show" with the lights under the fingers and keys flashing in an on and off sequence simultaneously with corresponding sounds of the keys and finger shapes. These lights and sounds are carefully programmed sets of sequences so all the sounds are harmonious. Throughout all instruction user is rewarded with multisensory stimuli.

Instruction for the very young child must be meticulously sequential, with no step of the process skipped. This apparatus allows no step to be skipped and each step must be mastered within the preset limits programmed into the electronic circuit before instruction advances to next step. For example, user must be able to activate proper sounding/illuminated/vibrating fingers and corresponding sounding/illuminated/vibrating keys one at a time as per verbal instruction before advancing to instruction involving a sequence of two or more sounding/illuminated/vibrating fingers and corresponding sounding/illuminated/vibrating keys at a time. If user has difficulty with a particular finger or key, the monitoring capability of the electronic circuit will function accordingly and have user activate that particular finger shape or key more often than the others in this particular activity until user's capability is equal with all fingers.

The on/off button/switch, FIG. 5, item 62, when activated for the first time, prompts the user to say his/her name. From that time forward the computer monitors the progress of that user. Each time this apparatus is switched on, the user is asked, "Are you <name>?". If this name does not match any name previously entered, user will be prompted to say his/her name and a new user will be added to the electronic circuit program. If user is a returning user, the electronic circuit automatically begins where user left off during previous use, beginning with a short review. At any time during the use of this apparatus the user is unable to do the present action, the electronic circuit will revert to the previous action/activity and will keep doing so until user is able to do actions of a particular activity within the preset limits programmed into the electronic circuit for that activity. This on/off button will automatically begin the instructional function of apparatus unless another button is activated. Apparatus will also automatically shut off if no action is activated within preset limits programmed into electronic circuit.

The song button/switch, FIG. 5, item 58, "plays" the songs programmed into the apparatus for the user. This allows the user to hear songs already learned as well as songs to be learned. For any user, young or old, familiarity with the sound of a song makes it easier to learn to play that song. While the songs are being performed, the keys vibrate and illuminate in color or in "white" as is appropriate for the level of the song, and finger shapes vibrate and illuminate corresponding to the fingering of the keys being played. User can hear, see and feel the songs. Activating this switch immediately overrides any current action/activity.

The button/switch, FIG. 5, item 61, activates the keys of the apparatus without instruction, without any illumination of keys or finger shapes, and without any vibration of keys or finger shapes. This allows the user to play whatever he/she wishes with no prompts.

The button/switch, FIG. 5, item 59, allows the user to choose an activity. Activities throughout the instructional functions are named. When this switch is activated user is asked to choose an activity by name, i.e. "Flashing Fingers" or "I Play You Play" and prompted to perform an action to indicate choice.

The button/switch, FIG. 5, item 60, allows the user to manually revert instruction to previous action. Each time the button is depressed, action reverts to previous action. FIG. 5, item 62A, is the volume control switch.

Right and left hands with defined shapes configured to represent right-hand and left-hand palms, thumbs, index fingers, middle fingers, ring fingers, and little fingers, FIG. 6, items 63-74, are embodied in the housing of this apparatus located above the keys, FIG. 1, item 4. Each of these shapes wholly or partly is formed of a suitable material that can function as a transparent colored lens. There is a light under each of these lenses indicated by indicia, FIG. 6, item 63-74. These shapes are color-coded to each other. FIG. 6, items 64 and 69 are color one, items 65 and 70 are color two, items 66 and 71 are color three, items 67 and in 72 are color four, items 68 and 73 are color five, item 63 is color six, and item 74 is color seven. These shapes comprising the left-hand shape and right-hand shape are child sized to enable a child to fit his/her hands on top of these shapes.

These individually defined shapes for the fingers and palms may each be activated by user when depressed anywhere on the shape. The lights under these shapes may be activated singly or jointly by electronic circuit program. These finger shapes prompt the user to use particular fingers on keys. In the beginning, activities are limited to the keys that are color-coded to the finger shapes. As user gains experience, the colors illuminated on the keys switch from the different colors to "white color" illumination. It is not necessary that the beginning user know the names of the colors, only that the user be able to match hand to hand shapes and to match color to color when instructed to play on the keys. For additional sensory instruction, each of these finger shapes are vibrated singly or jointly as a separate function or together with the illumination of each of these finger shapes when appropriate. When appropriate properly pitched sounds are simultaneously activated with lights or vibration, or with lights and vibration. Many of the users of this apparatus will be very young and the multi-sensory stimuli helps them to physically respond correctly to instruction.

Colored lights are placed underneath some of the white keys of this apparatus, FIG. 1, item 7-17. The white keys are made of a suitable material wholly or partly capable of being illuminated by these lights. These lights are the same set of colors as the lights in the finger shapes. FIG. 1, items 7,8, and 13 are color one, items 9 and 14 are color two, items 10 and 15 are color three, items 11 and 16 are color four, and items 12 and 17 are color five. All keys of this apparatus, FIG. 2, items 18-43 are able to be simultaneously sounded with any illuminated prompts, simultaneously vibrated with any illuminated prompt, or simultaneously sounded and vibrated with any illuminated prompt.

Rhythm is an integral part of music. Initially rhythm will be steady, even beats. As user gains in proficiency with functions of other activities, the rhythms involved will become more complicated. The multi-sensory stimuli in this apparatus allows the user to see, hear, and feel rhythm in order to duplicate rhythm accurately. For example, user hears rhythm with the finger shape or piano sound, simultaneously sees a finger shape or shapes and/or key or keys illuminate in an on/off sequence corresponding to sound of rhythm, and simultaneously feels an on/off vibration in a finger shape or shapes or key or keys. Any time user requires help with a given rhythm, no matter what instructional level of other activity, all sensory stimuli will function until user responds correctly to the rhythm.

Proper pitch is important to any piano/keyboard student. It is critically important for young students who are learning language, for the pitch they hear at this age becomes internalized just as speech. This apparatus generates two sounds: one sound involving the finger shape and the other sound an acoustic piano sound for the keys that functions like an acoustic piano with appropriate decay of sound when key is released. Both sounds are accurately pitched To 440A.

The initial instructional function of this invention teaches user to use each finger of each hand independently as shown in FIG. 7, items 75 and 76. This apparatus provides verbal instruction, properly pitched sound, visual help with use of color, as well as tactile help with use of the vibration. Especially when beginning instruction, many young children are unable to move a finger with only sound and visual prompts so the tactile vibration stimulus of this apparatus acts as a gentle "tapping" on their finger to help with eye-hand development.

EXAMPLE: The palm and finger shapes of one hand are illuminated. User is instructed to place his/her hand on top of illuminated hand shape. A predetermined time is allowed in the electronic circuit program for user to respond. The illumination of the palm and finger shapes then ceases and one finger shape sounds, illuminates and vibrates, FIG. 7, item 75. Sound ceases and user is instructed to depress that finger shape with his/her corresponding finger that is resting on top of the illuminated/vibrating finger shape. As user depresses finger shape the corresponding sound is again activated and vibration is deactivated. Sound ceases. If user continues to depress and release pressure on finger shape, sound will be activated and deactivated corresponding to depression and release. Verbal instruction will not continue until user discontinues activating the finger shape for a predetermined length of time. Illumination continues for that finger shape and correspondingly colored key sounds, illuminates, and vibrates. Sound ceases, but illumination continues. User is instructed to lift his/her hand off the hand shape. User is instructed to move his/her hand above the corresponding key, keeping the hand open, dropping down the finger corresponding to the illuminated finger shape and depressing the illuminated/vibrating key with said finger, FIG. 7, item 75, onto key, FIG. 7, item 76. Sound is activated and vibration deactivated as user depresses key. Illumination and sound continue, but cease when the user releases pressure on key. If user continues to depress and release key, key will illuminate and sound with pressure from user and deactivate when user releases pressure. At this level of instruction user may depress finger shape or key multiple times. This activity focuses only on user's ability to depress a correct finger shape or key, not how many times this particular finger shape or key is activated consecutively by the user.

When user accurately responds to previous activity within the predetermined mastery level programmed into the electronic circuit, instruction becomes more specific. User is instructed to activate a finger shape or key "one-time", "two times", etc. When user responds correctly to these prompts, rhythms are introduced. User is instructed to duplicate simple steady rhythms. For example, user is prompted to place his/her hand on top of illuminated hand. Illumination ceases. User hears audio verbal prompt, then simultaneously hears sound, sees on/off sequence of illumination, and feels on/off sequence of vibration. User is prompted to duplicate rhythm. As with every function, if user's response is correct, user is rewarded with happy sounds of approval and apparatus continues to next action. If user activates incorrect action, user is given positive encouragement to repeat and correct incorrect action.

When user is able to accurately respond to previous activity (responding correctly to multisensory prompts for finger shapes or keys as well as responding correctly to specific number of times to activate a finger shape or key in rhythm) within predetermined mastery level programmed into electronic circuit, instruction continues to next level, FIG. 13, playing a sequence.

EXAMPLE: Palm and finger shapes of one hand are illuminated. User is instructed to place his/her hand on top of illuminated hand. The illumination ceases and one finger shape sounds, illuminates and vibrates, FIG. 13, item 83. Sound ceases and user is instructed to depress, then release that finger shape with his/her corresponding finger. As user depresses finger shape the corresponding sound is activated and vibration is deactivated. User releases pressure on finger shape. Sound ceases, but illumination continues. User is instructed to keep his/her hand on top of the hand shape. A different finger from the one that is already illuminated sounds, illuminates and vibrates, FIG. 13, item 84. Sound ceases and user is instructed to depress that finger shape with his/her corresponding finger. As user depresses finger shape the corresponding sound is activated and vibration is deactivated. Sound ceases and illumination of both finger shapes cease when user releases pressure on finger shape, item 84.

User is prompted to watch entire prior action. Initial finger shape sounds and illuminates, FIG. 13, item 83. Sound ceases, illumination continues. The next finger shape sounds and illuminates, FIG. 13, item 84. Sound ceases but both finger shapes continue to be illuminated. User is instructed to repeat this sequence on the hand shape. The two illuminated finger shapes began to vibrate. Audio instruction indicates color of first finger shape, waits for activation response from user, then indicates color of second finger shape. When user depresses first finger shape, sound is activated and vibration ceases, but illumination remains. Sound ceases. When user depresses second illuminated/vibrating finger shape, sound is activated and vibration is deactivated. When user releases pressure on second finger shape, sound ceases and illumination for both shapes ceases.

User is instructed to move to the keys where the identical sequence is initiated on vibrating keys illuminated in color rather than the finger shapes, FIG. 13, items 85 and 86. Although this action is on the keys, the corresponding finger shapes simultaneously illuminate with illuminated keys as an additional prompt for user.

In this sequence as in all sequence activities of this apparatus the audio instruction, such as "press red finger", "press green finger", is given in a meticulously steady pace to correspond to the beats of music. The pace is determined by user's response to prior activities. Response time to initiate an action is also adjusted as per previous response time of user. As user is able to respond more quickly to instruction, the pace of instruction is automatically adjusted. If user is unable to respond in a steady rhythm for every action of an activity, the entire activity is repeated and adjusted to a slower rhythm. Later, when user is playing songs, this pace will continually adjust until it reaches proper pace or tempo of song. Steady rhythm cannot be readily explained to a young child, but a young child in "language learning mode" is able to assimilate steady rhythm when consistently exposed to steady rhythm. Older beginning students respond well to this type of learning steady rhythm as well.

When user is able to respond accurately to instruction generated by electronic circuit regarding single finger/key activities, first with single fingers of one hand, then single fingers of the other hand, then utilizing single fingers of both hands, all single finger/key activities are repeated without the vibration stimuli. If user has difficulty responding correctly to single finger/key activities without the vibration stimuli, those actions will cease. Instruction will continue with inclusion of vibration stimuli. Previous activities are repeated with the addition of the standard letter names of the keys, A through G, included in audio prompts such as "red D finger", then later only "D finger". If user has difficulty responding to letter names of keys given without a color prompt, color prompts remain. Periodically electronic circuit will try to delete "color prompt" until user is able to respond correctly without said prompt.

FIG. 14 illustrates instruction for user to use both right and left hands simultaneously to play in parallel. The illuminated finger shapes and keys indicated on FIG. 14, items 87, 88, 89, and 90, are all the same color, color five.

EXAMPLE: The initial action in this activity begins with the finger shapes. Finger shapes, items 87 and 89, sound, illuminate, and vibrate. Sound ceases. User is instructed to place his/her hands on the hand and finger shapes and is prompted to simultaneously depress his/her fingers corresponding to the illuminated/vibrating finger shapes. As user depresses the illuminated/vibrating finger shapes, sound is activated and vibration is deactivated. Sound ceases when user releases pressure on the shapes, but illumination remains. When user responds correctly to prior action, correspondingly colored keys, FIG. 14, items 88 and 90, sound, illuminate, and vibrate. Sound ceases but illumination continues on finger shapes and user is instructed to move his/her corresponding fingers to the illuminated finger shapes and to play the illuminated/vibrating keys. As user depresses illuminated/vibrating keys, sound is activated and vibration is deactivated. When user releases the keys, sound ceases as in an acoustic piano sound and all illumination ceases. The actions in this function continue until the user is able to play consistently and successfully "Hands Together" simultaneously in parallel on the hand and finger shapes as well as keys within predetermined limits of mastery programmed into electronic circuit.

FIG. 15 illustrates playing sequences simultaneously in parallel. In this activity the electronic circuit program activates function one, FIG. 15, items 90 and 92, or FIG. 15, items, 94 and 96, simultaneously with illumination and sound, then proceeds to activate function two, FIG. 15, items 91 and 93, or FIG. 15, items 95 and 97, simultaneously with illumination and sound. When electronic circuit activates function two, function one ceases to illuminate and sound.

EXAMPLE: User is instructed to place his/her hands on the hand and finger shapes. Function one finger shapes, items 90 and 92, sound, illuminate and vibrate. Sound ceases. User is instructed to depress shapes. Corresponding sound is activated and vibration deactivated when user depresses shapes. Sound ceases when user releases pressure, but illumination remains until end of action. Function two finger shapes, items 91 and 93, sound, illuminate and vibrate. Sound ceases. User is instructed to depress illuminated/vibrating shapes. Sound is activated and vibration is deactivated as user depresses shapes. Sound ceases when user releases pressure, and all illumination ceases.

User is instructed to watch complete action of function one and function two with illumination and sound of corresponding shapes. Vibration mechanism is engaged on the illuminated finger shapes. User is then instructed to place hands on hand shape and repeat function one and function two independently. If user is unable to respond correctly, instruction reverts to beginning of this example. Instruction continues to be repeated from the beginning until user is able to play this sequence independently. If user is able to respond correctly, action continues to keys.

Function one shapes illuminate and simultaneously function one keys, FIG. 15, items 94 and 96, sound, illuminate and vibrate. Sound ceases. User is prompted to depress illuminated/vibrating keys with his/her fingers corresponding to illuminated finger shapes. As user depresses keys, sound is activated and vibration is deactivated. Key sound ceases when user releases pressure on keys, but illumination remains. Function two shapes illuminate and simultaneously function two keys, FIG. 15, items 95 and 97, sound, illuminate and vibrate. Sound ceases. User is instructed to depress function two illuminated/vibrating keys using his/her fingers corresponding to function two illuminated finger shapes. As user depresses keys, sound is activated and vibration is deactivated. When user releases pressure on keys, sound ceases and all illumination on keys and finger shapes ceases as this is end of action.

As with this action on the finger shapes, user is instructed to watch function one and function two on the keys, then instructed to perform action independently. Again as with action on finger shapes, action is repeated as necessary until user is able to perform action independently before moving to next activity or action.

Prompts to user in this activity include audio verbal instruction, illumination, vibration and sound. As user is able to consistently play a sequence of two keys in each hand simultaneously in parallel with steady rhythm, instruction will continue using a sequence of three, then a sequence of four, etc. This activity teaches user to remember a sequence or song sequence. The illuminated and vibrating finger shapes and keys serve as a help. As in single shape/key activities, prior sequence activities are repeated without vibration stimuli. However, if user cannot respond correctly without vibration stimuli, activities continue with the inclusion of vibration stimuli. It is not necessary that user be able to respond properly without the vibration stimuli in order to go on to the next level. When user masters this function within the predetermined limits programmed into the computer, instruction will continue to the next level.

The button/switch, FIG. 5, item 59, which allows the user to choose an activity has a function allowing the user to create his/her own song or sequence. Initially all keys that have the lights that are the same colors as the finger shape lights are illuminated. User is prompted to play his/her own song on the illuminated keys only. User is then prompted to play his/her song again. If user is unable to play his/her song again, electronic circuit generates prompt asking user if he/she would like some help remembering song. If user activates an affirmative response, electronic circuit program treats user's sequence in the same manner as prior activities involving sequences, utilizing sound of finger shapes, illuminated and vibrating finger shapes, sound of keys and illuminated and vibrating keys. If user is able to play his/her song again, electronic circuit generates happy sound. If user has advanced to the functions of instruction that utilize the "white" illuminated keys, keys will not illuminate initially and user will be prompted to play his/her song on any key or keys of the apparatus. If user needs help to play his/her own song again, finger shapes will not illuminate, but keys will illuminate in "white" during the instruction process.

FIG. 16 shows the right-hand finger shape, item 99, illuminated and the left-hand finger shape, item 98, illuminated. The finger shape, item 99, is illuminated in color three and the illuminated shape, item 98, is illuminated in color one. User is prompted to place his/her hands on top of these right-hand and left-hand shapes, then activate the illuminated/vibrating finger shape under the right-hand simultaneously with the illuminated/vibrating finger shape under the left-hand. This is the first time user will be prompted to activate finger shapes that are not the same color. This activity will go back and forth between illuminated/vibrating finger shapes and illuminated/vibrating colored keys as in previous activities. Activity will start with one action at a time, that is, activating one illuminated/vibrating finger shape with the right-hand simultaneously with one illuminated/vibrating finger shape of the left-hand or playing one key with the right-hand and one key of the left-hand as per illuminated/vibrating keys. When user can consistently and accurately activate the correct finger shapes or keys, instruction continues with sequences of actions, starting with two actions in a row, then increasing length of sequence as user is able to correctly respond within predetermined limits of mastery and pre-determined length of sequences. All previous activities that have necessitated the inclusion of vibration stimuli are repeated without vibration stimuli. If user is unable to respond properly without vibration stimuli, activities cease and user continues with next level of instruction with the inclusion of the vibration stimuli.

EXAMPLE: FIG. 17 illustrates prior activity, called "contrary motion", for a sequence of three actions. Vibration is used or not used in this function based on user's capability in prior activities. For illustration purposes this example assumes user no longer needs vibration stimuli. User is first shown "action one" using only the finger shapes. Finger shape, item 104, and finger shape, item 100, are illuminated together with sound. Sound ceases but illumination remains and user is prompted to activate these two keys simultaneously with user's corresponding fingers. Sound is activated as user presses shapes and sound ceases as user releases pressure on shapes. If user responds correctly illumination ceases. If user responds incorrectly, user is prompted to repeat action.

When user responds correctly to "action one", electronic circuit proceeds to action two: finger shape, item 104, and finger shape, item 100, are illuminated together with sound, sound ceases but illumination remains, finger shape, 103, and finger shape, item 101, are illuminated together with sound. Sound ceases but illumination remains. User is prompted to repeat the two actions in sequence shown. If user responds correctly, illumination ceases. If user responds incorrectly, user is prompted to repeat these two actions with necessary electronic circuit prompts until user is able to respond correctly.

Electronic circuit proceeds to action three: finger shape, item 104, and finger shape, item 100, are illuminated together with sound, sound ceases but illumination remains; finger shape, item 103, and finger shape, item 101, are illuminated together with sound, illumination remains, sound ceases; finger shape, item 103, and finger shape, item 102, are illuminated together with sound, sound ceases but illumination remains. User is prompted to repeat the sequence of three actions. If user responds correctly he/she is prompted to repeat these three actions, one at a time, on the illuminated keys color-coded to the finger shapes. Color-coded finger shapes are activated along with color-coded keys for this function. If user responds incorrectly activity is repeated until user achieves proficiency predetermined in program of electronic circuit.

This activity prompts user to play in "contrary motion" for many sequences and songs until user gains proficiency as predetermined in program of electronic circuit before moving to next level of instruction. All sequences and songs in these activities utilize the notes of the C Major scale and broken C, G, G7th, and F chords (I, IV, V, and V7 chords of C Major scale). All song sequences must be memorized before user is allowed to move to next level of instruction.

Figure 2:
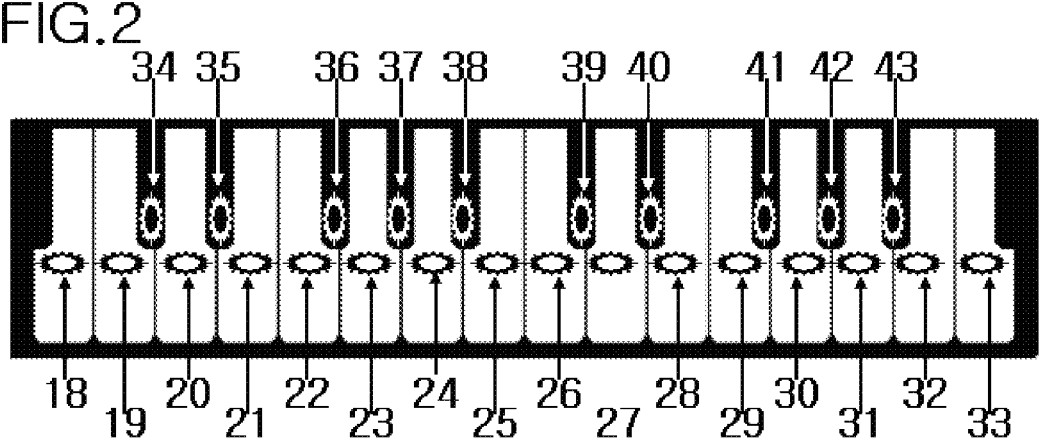
FIG. 2: keyboard assembly
items 18-33: indicia for same color lighting under white keys
items 34-43: indicia or same color lighting under black keys

FIG. 2, items 18-43, illustrate the second set of lights placed under each key of apparatus, both white keys, items 18-33, and black keys, items 34-43. When user is able to play "contrary motion" consistently and accurately with prompts using simultaneous color-coded finger shapes and keys color-coded to the fingering shapes, the electronic circuit program switches from using multicolor illuminated keys to the "white" illuminated keys. All previous contrary motion sequences and songs will be reviewed with the "white" illuminated keys rather than the multicolored illuminated keys. New sequences and songs will use all keys of apparatus including black keys. Illuminated finger shapes will prompt user to use corresponding finger or fingers to the illuminated finger shapes on the "white" illuminated keys. Verbal instruction will always include prompting to the user to use corresponding fingers to the illuminated finger shapes on the "white" illuminated keys. Vibration mechanism will be used as needed in these activities. All songs in this activity must be memorized before user is allowed to move to next level of instruction.

FIG. 18 indicates standard fingering for keyboard instruments. To begin to prepare user to be able to play notation marked with fingering with no color coding help, user is instructed that each finger has a label number. As per indicia on finger shapes, the thumbs of both hands are labeled "1", the index fingers of both hands are labeled "2", middle fingers of both hands are labeled "3", the ring fingers of both hands are labeled "4", and the little fingers of both hand are labeled "5". All previous activities on finger shapes are repeated. Verbal audio instruction indicates a finger number corresponding to illuminated finger shape, for an example, "right-hand green 3 finger". Periodically verbal prompts will indicate proper finger by fingering number only, "right-hand finger 3" etc. If user responds correctly prompts will continue using fingering number only. If user has difficulty responding to "fingering number only", verbal prompts will revert to the combination color/fingering for user. The electronic circuit program will periodically use prompts with "fingering number only" until user is able to respond correctly with "fingering number only" prompts.

FIG. 19 illustrates finger shape prompts as well as keyboard prompts for user to depress more than one finger shape at a time or play more than one key at a time simultaneously within one hand. User is prompted to place hand on illuminated palm and finger shapes of one of the hand shapes on apparatus. Illumination of all finger shapes cease followed by the sound, illumination and vibration of two or more finger shapes, items 110 and 111. Sound is activated as finger shapes are initially illuminated, then ceases. User is prompted to depress illuminated/vibrating finger shapes with his/her corresponding fingers. Sound is activated and vibration deactivated as user depresses finger shapes and sound ceases when user releases pressure on finger shapes. If user is able to correctly respond, action is repeated on keys using the "white" illumination and vibration, items 112 113. Sound is activated when keys are initially illuminated then ceases. Key sounds are activated and vibration deactivated as user depresses keys and sound ceases when user releases pressure on keys. Color-coded illuminated finger shapes are illuminated during key action as a prompt to the user to use his/her corresponding fingers to the illuminated finger shapes for this action. This function requires user to depress keys simultaneously within the preset mastery limits programmed into electronic circuit. This action, simultaneously depressing two finger shapes or keys with one hand, may be very difficult for the user. It is not necessary for user to be able to successfully respond to this activity in order to proceed to next level. If user is unable to respond correctly to this function after predetermined number of attempts, this function ceases and proceeds to the next level. Periodically this function will be introduced to user until user is able to respond within preset mastery limits of electronic circuit program.

FIG. 20 illustrates a front view of apparatus with display screen, item 114, attached. This display screen is capable of displaying static graphics as well as dynamic audio/video. For purposes of illustration for succeeding functions, the display screen illustrated will be that of FIG. 20, FIG. 9 and FIG. 8 (front, open and shut views). The side view, closed display screen illustration, FIG. 8, also illustrates a receptacle for charging the battery, item 78, receptacle for optional audio head set, item 79, and USB port. FIG. 11 illustrates the display screen incorporated into a lid, item 80, and FIG. 10 shows lid, item 79, in closed position. FIG. 12 illustrates the front view of display screen, item 80, incorporated into a shaped lid, item 82.

FIG. 21 illustrates a treble staff notation display on attached display screen. Item 115 shows a standard type of musical note with a colored outline, color of which corresponding to an illuminated finger shape. Item 121 shows the treble clef symbol properly placed on five lines with four spaces in between. Items 116-120 show the standard five lines with four spaces of standard music notation. Verbal audio instruction explains music symbolism to user.

EXAMPLE: FIG. 22 shows top view of apparatus with same displayed note, item 122, as in FIG. 21. Item 123 denotes an illuminated finger shape. Item 124 denotes the "white" illuminated key that corresponds to notation on display screen. Illuminated key sounds then ceases to sound. User is prompted to play color-coded note displayed on screen on the illuminated key using his/her corresponding finger to the illuminated finger shape. Key sounds when user activates key, then ceases to sound when user releases pressure on key. When user is able to respond correctly to activities such as this one utilizing all keys in apparatus including black and white keys, with corresponding verbal explanation of additional music terminology such as "sharp" and "flat", instruction progresses to next level. During all activities, in addition to verbal prompts, a finger shape will illuminate to prompt user to use his/her corresponding finger to activate illuminated key. Most users will not need the additional sensory stimulus of vibration on the keys. However, if user still needs a tactile sensory stimulus of vibration, the electronic circuit will include that sensory stimulus in these actions. When user responds within predetermined level of accuracy instruction continues to next level.

FIG. 23 illustrates a sequence of notes utilizing displayed notation outlined in color, color of which corresponding to finger shapes, sound, vibration stimuli if needed, and illuminated finger shapes.

EXAMPLE: User has previously played the initial displayed note, outlined with color coded to illuminated finger shape prompting user to use a particular finger on an illuminated or illuminated/vibrating key. FIG. 23 shows the second note in the display encircled with a box, item 126. The music note, item 125, is outlined with color, coded to the illuminated finger shape, item 127. The vibrating (if needed) and "white" illuminated key, item 128, indicates key to be played by user's corresponding finger to the illuminated finger shape. In this activity, user has previously and correctly played the first color-coded note prompted with corresponding illuminated finger shape, vibration stimulus if needed and "white" key illumination. At this point in the activity the electronic circuit reviews for user both notes with corresponding prompts and user is to start at the beginning and correctly play both notes of the sequence. If user is able to consistently respond correctly to sequences of two notes in activities such as this with a steady rhythm, instruction proceeds to sequences of three notes and ultimately to an entire song with multiple rhythms. The user is required to remember a sequence from the beginning even if the entire sequence is not displayed on the screen. Any time user responds incorrectly, activity reverts to prior action.

FIG. 24 illustrates top view of apparatus with display screen. The music note, item 129, is no longer color-coded; it is displayed as standard notation with no color coding. Item 130 indicates a number which corresponds to the user's finger, this fingering number being color-coded to the illuminated finger shape, item 131. Item 132 is the "white" illuminated (and vibrating if needed) key corresponding to notation displayed on screen. User is prompted to use his/her finger "2" to play illuminated key. The finger shape remains illuminated as a reminder to user which of his/her fingers is the color-coded finger number "2". All above notation activities are repeated with standard notation and fingering color-coded to color illuminated finger shapes until user achieves level of mastery as predetermined in electronic circuit program.

FIG. 25 illustrates top view of apparatus with display screen. The note on display screen, item 133, is displayed in standard notation with no color coding. The number, item 134, is displayed as standard fingering without color coding. Key, item 136, is "white color" illuminated and vibrated if needed. User is required to play displayed note on corresponding key and prompted to use the correct finger as indicated by the fingering number on display screen and illuminated finger shape. All previous activities are repeated until user is able to play any note displayed in standard notation and standard fingering with no color coding, on the corresponding illuminated- and vibrating if necessary—key of apparatus, together with illuminated shape to remind user which finger corresponds to fingering number.

FIG. 26 shows previous activity repeated with standard notation displayed with no color-coding, item 137, standard fingering number displayed with no color-coding, item 138, keys with no illumination, but illuminated finger shape, item 139, still functioning. All activities beginning with one displayed note on display screen are repeated until user is able to play correctly on keys of apparatus with no help from illuminated or vibrating keys.

FIG. 27 illustrates top view of apparatus with display on display screen, two finger shapes with illumination indicia, and keys with "white color" illumination indicia. Items 142 and 143 illustrate two notes on the grand staff that are to be played simultaneously. Items 141 and 144 illustrate finger numbers that are color-coded to the illuminated finger shapes, items 146 and 145. Item 140 denotes a box encircling both notes to indicate present action to user. Item 148 denotes "white color" illuminated key corresponding to note displayed on treble staff. Item 147 denotes "white color" illuminated key corresponding to note displayed on bass staff. User is instructed to play these two displayed notes simultaneously on the corresponding illuminated keys using his/her fingers which correspond to the illuminated finger shapes. When user is able to respond within predetermined mastery level as programmed into electronic circuit program to all such activities utilizing notation corresponding to all keys of apparatus, instruction continues to next level.

FIG. 28 illustrates continued use of the color-coded finger shapes to indicate to user which finger or fingers to use, and "white" illuminated keys. Activities of prior function, FIG. 27, are repeated using standard notation with no color coding, FIG. 28, items 149 and 150, standard fingering with no color coding, illuminated finger shapes, and "white" illumination on keys until user is able to respond within pre-determined mastery level skills as programmed into electronic circuit program.

FIG. 29, shows same action as prior action, FIG. 28, without illuminated keys, items 151 and 152. All actions of previous activity are repeated without illuminated keys until user is able to respond within pre-determined mastery level skills as programmed into the electronic circuit program.

FIG. 30 illustrates top view of apparatus displaying standard notation utilizing color-coded fingering, items 154 and 156, box encircling present action, item 157, illuminated finger shapes, items 158 and 160, and no illumination on keys, items 159 and 161. FIG. 30 illustrates the second action of an activity instructing user to play a sequence utilizing one note of the treble staff and one note of the bass staff. User has already correctly activated the two notes of first action and box indicates that user is to correctly activate notes of second action with his/her fingers corresponding to color-coded fingering numbers (which correspond to illuminated fingers of finger shapes) on non-illuminated keys. When user is able to correctly respond to this notation which retains the color-coded fingering numbers which correspond to the illuminated finger shapes on non-illuminated keys at a predetermined mastery level, instruction continues.

FIG. 31 denotes top view of apparatus with display on screen displaying standard notation utilizing standard fingering, items 162 and 163. All activities involving user ability to play a sequence utilizing one note of the treble staff and one note of the bass staff are repeated using standard notation that is not color-coded, standard fingering which is not color-coded, illuminated finger shapes as a continual prompt for user to use correct fingering, non-vibrating keys, and non-illuminated keys. At this point user is able to respond to standard notation for a keyboard instrument and to respond correctly on the keys. While using this apparatus, however, illuminated finger shapes will continually prompt user to use proper fingering as shown on notation display.

The functionality of this apparatus can be independent of the hardware as described in claims in a similar but with reduced functionality in any of the popular gaming systems or computer systems with suitable tactile and sensory capabilities.

FIG. 32, item 164, a schematic drawing which denotes housing with embodied/associated components: battery, item 165A; visual display, item 165; activation switches, item 166; vibration mechanism, item 167; keyboard assembly, item 168; lighting mechanism, item 169; hand pads or shapes, item 170; electronic circuit, item 171; microphone, item 172; and external speaker, item 173.

FIG. 33, a schematic drawing which denotes input and output of assemblies as relating to electronic circuit, item 174: microphone, item 175; external speaker, item 176; hand pads, item 177; vibration mechanism, item 178; visual display, item 179; lighting mechanism, item 180; keyboard assembly, item 181; optional external printer, item 182; and optional external computer, item 183.

FIG. 34, a schematic drawing showing input/output of sub-assemblies: lights associated with defined shapes of fingers and palms of hands, item 188; vibration effect associated with defined shapes of fingers and palms of hands; lights associated with keys of keyboard assembly, item 190; and vibration effect associated with keys of keyboard assembly, item 191. Hand pad assembly denoted by item 186, and keyboard assembly denoted by item 187. Input and output denoted from electronic circuit to hand pad assembly: item 184. Input and output denoted from electronic circuit to keyboard assembly: item 185.

What is claimed is:

1. An interactive, integrated electronic circuit operated apparatus capable of independently teaching a user, even a young pre-reading child, to play the piano or other keyboard instrument comprised of:

a suitable, durable housing;

an electronic circuit with suitable input/output capabilities to generate speech, to sense the activation of an input from the user, to determine correct or incorrect activation input by user, to generate sensory output to indicate correct or incorrect actions by user, and to monitor input of user to determine stimulus output for next appropriate action to the user based on consistent accuracy or inaccuracy of user and response time of user;

a child-sized right and left hand with a defined shape for each finger and palm formed wholly or partly of a suitable material that can function as a transparent lens allowing light to pass through all or part of each defined shape to prompt user to place hands on top of shapes matching each of user's fingers to correspondingly defined finger shapes;

defined shapes for each finger and palm wholly or partly to be one of five different colors;

defined shapes for each finger to be color-coded: right-hand thumb to left-hand little finger, right hand index finger to left-hand ring finger, right hand middle finger to left-hand middle finger, right hand ring finger to left-hand index finger, right hand little finger to left-hand thumb, to prompt user to correctly activate color-coded finger shape or shapes as indicated to user;

defined shapes for each finger and palm able to be selectively activated by electronic circuit one or more at a time;

defined shapes for each finger and palm able to be activated one or more at a time by user;

a particular lighted indicator such as an LED associated with each individual finger/palm shape able to illuminate the shape to indicate to the user a particular shape or shapes;

lighting indicators for each shape able to be selectively activated by electronic circuit one or more at a time;

a vibration mechanism associated with each shape able to vibrate each shape singly or jointly;

a vibration mechanism able to be actuated singly or jointly by electronic circuit to indicate to the user a particular shape or shapes;

a piano type keyboard assembly integrated within the housing;

a piano type keyboard assembly coupled to electronic circuit having a nominal number of white keys with corresponding black keys capable of being actuated singly or jointly;

the piano type keyboard assembly made of a suitable material capable of being illuminated with a colored light such as an LED placed under the key, or a light such as an LED placed under a colored lens affixed to underside the key, that singly or jointly may be actuated in order to produce a colored effect on the key or keys thereby illuminating the key or keys to prompt user to activate illuminated keyboard key or keys;

a vibration mechanism able to be actuated to selectively vibrate all keys of the keyboard assembly singly or jointly;

an additional set of lights all in uniform color, for defining purposes hereafter referred to as "white" lights, one under each key able to be selectively actuated singly or jointly;

white lights, one under each key able to be actuated singly or jointly in order to produce an illuminated effect on the key or keys to prompt user to activate illuminated key or keys singly or jointly;

key sounds that imitate the sound and decay of sound of an acoustic piano able to be selectively actuated singly or jointly to familiarize user with proper piano sound;

key sounds pitched to a standard 440A pitch to expose user to accurate piano pitch;

a sound for each individual finger shape which is compatible with but not necessarily the same as the acoustic piano sound of the keys of this apparatus able to be selectively actuated singly or jointly;

finger shape sounds and key sounds able to be actuated together;

an appropriate display such as an LCD flat-panel monitor coupled to electronic circuit with wired or wireless capability to add additional visual stimulus to user for further musical instruction such as notation, related dynamic audio visual demonstration, and additional nomenclature;

said appropriate display such as an LCD flat-panel monitor to be attached to housing or integrated in housing;

an electronic circuit able to output to an external printer by wired or wireless connection the visual notation displayed on screen to give user a hard copy of action;

an electronic circuit able to output to an external printer by wired or wireless connection a written progress report of user; and electronic circuit able to download additional data by wired or wireless connection.

2. An electronic circuit driven, multi-sensory, pleural stimuli, interactive method of instruction for teaching the user to play a keyboarded musical instrument using components and functions of apparatus to generate verbal prompts to the user simultaneously with other sensory prompts as indicated by the following:

to illuminate single or multiple finger shapes one at a time, in any sequence, one shape or multiple shapes at a time, prompting the user to activate said shape or shapes with user's finger or fingers which correspond to the illuminated finger shape or shapes;

to vibrate single or multiple finger shapes to prompt user to activate said shape or shapes with user's finger or fingers corresponding to the vibrating shape or shapes;

to vibrate single or multiple finger shapes and simultaneously to illuminate a finger shape or finger shapes to prompt user to activate shape or shapes with user's finger or fingers corresponding to the vibrating/illuminated shape or shapes;

to vibrate single or multiple finger shapes in a predetermined rhythm to prompt user to duplicate rhythm by activation of finger shapes;

to vibrate single or multiple finger shapes in a predetermined rhythm and simultaneously to illuminate corresponding finger shape or shapes in said predetermined rhythm, allowing user to both feel and see the predetermined rhythm to prompt user to duplicate rhythm by activation of finger shapes;

to illuminate key or keys in a color of a finger shape or shapes to prompt user to use his/her finger or fingers corresponding to the color of the finger shape or shapes to activate the key or keys illuminated in a color of the finger shape or shapes;

to selectively activate light or lights under a key or keys to prompt the user to activate said key or keys;

to vibrate key or keys, to simultaneously illuminate in color said key or keys, and to simultaneously illuminate finger shape or shapes, to prompt user to activate said vibrating, illuminated key or keys as indicated by both the visual colored illumination and tactile vibration of key or keys with user's finger or fingers that correspond to the illuminated finger shape or shapes;

to illuminate key or keys one at a time or in a sequence, in colors which correspond to a finger shape or shapes, and simultaneously to illuminate corresponding finger shape or shapes indicating finger or fingers to be used on said key or keys, to prompt the user to activate said key or keys with user's finger or fingers that correspond to the illuminated finger shape or shapes;

to vibrate a key or keys, one at a time or in sequence, and simultaneously to illuminate finger shape or shapes corresponding to user's finger or fingers that should be used on said vibrating key or keys to prompt user to activate said vibrating key or keys using the finger or fingers corresponding to the illuminated finger shape or shapes;

to illuminate in "white" a key or keys one at a time, or in a sequence, and simultaneously to illuminate corresponding finger shape or shapes indicating finger or fingers to be used on said key or keys, to prompt the user to activate said key or keys with user's finger or fingers that correspond to the illuminated finger shape or shapes;

to vibrate a key or keys, one at a time or in sequence, simultaneously to illuminate in "white" said key or keys, and simultaneously to illuminate finger shape or shapes indicating finger or fingers to be used on said illuminated and vibrating key or keys, to prompt the user to activate said illuminated and vibrating key or keys with user's finger or fingers that correspond to the illuminated finger shape or shapes;

to activate the accurate piano sound and pitch when key or keys are activated to enable user to hear proper sound and pitch;

to activate the properly pitched sound when finger shape or shapes are activated to enable user to hear proper pitch;

to activate sounds of both keys and finger shapes simultaneously to enable user to hear accurate pitch utilizing two simultaneous sounds;

to activate sound or sounds of a finger shape or finger shapes when finger shape or shapes are vibrated to enable user to both hear and feel simultaneous sensory stimuli;

to activate sound or sounds of a key or keys when key or keys are vibrated to enable user to both hear and feel simultaneous sensory stimuli;

to visually display on flat-screen monitor standard music notation with music notes placed properly on treble staff, bass staff, or grand staff to prompt the user to activate corresponding key on apparatus to the visually displayed notation;

to display notation singly or in multiples as determined by skill level of user;

to display notation color coded to finger shapes, and simultaneously to illuminate colored finger shape or shapes, to prompt user to use his/her finger corresponding to illuminated finger shape or shapes to activate a particular "white" illumination or colored illuminated key or keys indicated by the notation;

to display notation color coded to finger shape, simultaneously to illuminate colored finger shape or shapes, and simultaneously to activate a "white" illumination or colored illumination of key or keys, to indicate to user to use his/her corresponding finger or fingers corresponding to illuminated finger shape or shapes to activate the color illuminated or "white" illuminated key or keys indicated by notation on display screen;

to display notation color coded to finger shapes, simultaneously to illuminate colored finger shape or shapes, and simultaneously to vibrate the particular key or key as indicated by the displayed notation, to prompt user to use his/her finger or fingers corresponding to illuminated finger shape or shapes to activate said particular vibrating key or keys indicated by the notation;

to display standard notation, that is, without color coding to finger shapes, simultaneously to illuminate colored finger shape or shapes, and simultaneously to activate the color illumination or "white" illumination of key or keys, to indicate to user to use his/her corresponding finger or fingers corresponding to illuminated finger shape or shapes to activate the color or "white" illuminated key or keys indicated by notation on display screen;

to display standard notation, simultaneously to illuminate colored finger shape or shapes, simultaneously to vibrate a particular key or keys, to prompt user to use his/her corresponding finger or fingers to the illuminated finger shape or shapes to activate vibrating key or keys indicated by notation on display screen;

to display standard notation, and simultaneously to illuminate colored finger shape or shapes, to prompt user to use his/her corresponding finger or fingers to the illuminated finger shape or shapes to activate key or keys indicated by notation on display screen;

to display notation color coded to finger shapes with one or multiple notes on screen, and simultaneously to illuminate the finger shapes for this color-coded notation one at a time, to prompt user to activate each key of the notation one at a time using the user's corresponding finger to the illuminated finger shape for activating said keys;

to display visual notation color coded to finger shapes with one or multiple notes on screen, simultaneously to illuminate the finger shapes for this color-coded notation one at a time, and simultaneously to illuminate in a color or "white" the key or keys for this color-coded notation one at a time, to prompt user to activate each key of the notation one at a time using the user's corresponding finger to the illuminated finger shape for each of said keys;

to display visual notation color coded to finger shape with one or multiple notes on screen, simultaneously to illuminate the finger shapes for this color-coded notation one at a time, and simultaneously to vibrate individual keys for this notation one at a time, to prompt user by this visual and tactile sensory stimuli to activate each key of the notation one at a time using the user's corresponding finger to the illuminated finger shape for activating each key;

to display visual notation color coded to finger shapes with one or multiple notes on screen, to simultaneously illuminate the finger shapes for this color-coded notation one at a time, to simultaneously illuminate keys in color or "white" one a time, and simultaneously vibrate individual keys for this notation one at a time, to prompt user by visual and tactile sensory stimuli to activate each key of the notation one at a time using the user's corresponding finger to the illuminated finger shape to activate illuminated/vibrating keys;

to display visual standard notation consisting of one note or multiple notes on screen, simultaneously to illuminate the finger shape or shapes, and simultaneously to illuminate key or keys corresponding to said displayed notation, to prompt user to activate key or keys one at a time for that visual notation using the user's corresponding finger to the illuminated finger shape;

to display visual standard notation consisting of one note or multiple notes on screen, simultaneously to illuminate corresponding color-coded finger shape or shapes, and simultaneously to vibrate keys corresponding to notation, to prompt user to activate vibrating key or keys one at time for that visual notation using the user's corresponding finger to the illuminated finger shape;

to display visual standard notation consisting of one note or multiple notes on screen, to simultaneously illuminate color-coded finger shapes corresponding to finger or fingers that should be used for said notation, to illuminate key or keys corresponding to notation, and to vibrate said keys, to prompt user to activate illuminated and vibrating key or keys one at time for that visual notation using the user's corresponding finger or fingers to the illuminated finger shape or shapes;

to display visual standard notation one note or multiple notes at a time, with indicated fingering above or below each note or notes displayed color-coded to corresponding colors of finger shapes, and simultaneously to illuminate corresponding finger shape for each note, to prompt user to activate each key for that visual notation one at a time using the user's corresponding finger to the color-coded fingering number as per illuminated finger shape or shapes;

to display visual standard notation one note or multiple notes at a time, with indicated fingering number above or below the note or notes displayed color-coded to finger shapes, to simultaneously illuminate corresponding shape or shapes, and simultaneously to illuminate corresponding key or keys, to prompt user to activate each key for that visual notation one at a time using the user's corresponding finger to the color-coded fingering number as per illuminated finger shape or shapes;

to display visual standard notation one note or multiple notes at a time, with indicated fingering number above or below the note or notes displayed color-coded to finger shapes, to simultaneously illuminate a finger shape for each note, and simultaneously to vibrate key or keys corresponding to visual notation, to prompt user to activate each vibrating key for that visual notation one at a time using the user's corresponding finger to the color-coded fingering number as per illuminated finger shape or shapes;

to display visual standard notation one note or multiple notes at a time, with indicated fingering number above or below the note or notes displayed color-coded to finger shapes, simultaneously to illuminate corresponding finger shape or shapes, simultaneously to illuminate key or keys corresponding to visual notation, and simultaneously to vibrate key or keys corresponding to visual notation, to prompt user to activate each illuminated and vibrating key or keys for that visual notation one at a time using the user's corresponding finger to the color-coded fingering number as per illuminated finger shape or shapes;

to display visual standard notation one note or multiple notes at a time, with indicated standard, that is, not color-coded to finger shapes, fingering number above or below the displayed note or notes, and simultaneously to illuminate finger shape or shapes corresponding to fingering number, to prompt user to activate each key for said visual notation one at a time using the user's corresponding finger to the standard fingering number as per illuminated finger shape or shapes;

to display visual standard notation one note or multiple notes at a time, with indicated standard fingering number above or below the displayed note or notes, simultaneously to illuminate finger shape or shapes corresponding to fingering number or numbers, and simultaneously to illuminate key or keys corresponding to visual notation, to prompt user to activate each key for that visual notation one at a time using the user's corresponding finger as per illuminated finger shape or shapes to the standard fingering number;

to display visual standard notation one note or multiple notes at a time with indicated standard fingering number above or below the displayed note or notes, simultaneously to illuminate finger shape or shapes corresponding to finger number or numbers, and simultaneously to vibrate key or keys corresponding to visual notation, to prompt user to activate each vibrating key for that visual notation one at a time using the user's corresponding finger as per illuminated finger shape or shapes;

to display visual standard notation one note or multiple notes at a time with indicated standard fingering number above or below the displayed note or notes, simultaneously to illuminate finger shape or shapes corresponding to fingering, simultaneously to illuminate key or keys corresponding to visual notation, and simultaneously to vibrate key or keys indicated by visual notation, to prompt user to activate each illuminated and vibrating key for that visual notation one at a time using the user's corresponding finger as per illuminated finger shape to the standard fingering number; and to gradually eliminate instructional, sensory stimuli one at a time until user is able to correctly play, read and respond to standard music notation on any keyboarded musical instrument.

3. The method of claim 2, whereby electronic circuit, determines when it is appropriate to output properly pitched sound for an illuminated finger shape or shapes to indicate both a visual and audio sensory stimuli for user;

determines when it is appropriate to output properly pitched sound for a key or keys to give user audio stimulus when activating a key or keys;

determines when it is appropriate to output properly pitched sound simultaneously with the vibration of finger shape or shapes or the vibration of a key or keys in order to give user simultaneous tactile and audio sensory stimuli;

determines when it is appropriate to output properly pitched sound for both an illuminated finger shape and a key simultaneously to give user visual and audio sensory stimuli;

determines when it is appropriate not to output properly pitched sound for an illuminated finger shape or shapes to give user a visual sensory stimulus only;

determines when it is appropriate not to output properly pitched sound for an illuminated key or keys to give user a visual sensory stimulus only;

determines when it is appropriate not to output properly pitched sound for both an illuminated finger and an illuminated key simultaneously to give user visual sensory stimulus only; and determines when it is appropriate not to output properly pitched sound for the vibration of a finger shape or shapes, or key or keys to give user only visual and tactile sensory stimuli.

4. The method of claim 2, whereby electronic circuit determines whether user activated correct shape or shapes as indicated by the illumination of shape or shapes and indicates to user whether user's action was correct or incorrect;

determines whether user activated correct shape or shapes as indicated by vibration of said finger shape or shapes and indicates to user whether user's action was correct or incorrect;

determines whether user activated correct shape or shapes as indicated by the illumination of a finger shape or shapes and simultaneous vibration of finger shape or shapes and indicates to user whether user's action was correct or incorrect;

determines whether user activated the correct shape or shapes in rhythm as indicated by the vibration of finger shape or shapes and indicates to the user whether user's action was correct or incorrect;

determines whether user activated the correct shape or shapes in rhythm as indicated by the illumination of a finger shape or shapes and simultaneous vibration of finger shape or shapes and indicates to the user whether user's action was correct or incorrect;

determines whether user activated the correct or incorrect key or keys as indicated by the illumination of key or keys and indicates to user whether user's action was correct or incorrect;

determines whether user activated the correct or incorrect key or keys as indicated by the illumination of key or keys and simultaneous illuminated shape or shapes and indicates to user whether user's action was correct or incorrect;

determines whether user activated the correct or incorrect key or keys as indicated by the vibration of key or keys and simultaneous illumination of shape or shapes and said indicates to user whether user's action was correct or incorrect;

determines whether user activated the correct or incorrect key or keys as indicated by the vibration of key or keys, simultaneous illumination of key or keys, and simultaneous illumination of shape or shapes, and indicates to user whether user's action was correct or incorrect;

determines whether user activated correct or incorrect key or keys as indicated by the "white color" illuminated key or keys and simultaneous color-coded finger shape or shapes and indicates to user whether user's action was correct or incorrect; and determines whether user activated correct or incorrect key or keys as indicated by the "white color" illuminated key or keys, simultaneous vibration of said key or keys and simultaneous color-coded finger shape or shapes, and indicates to user whether user's action was correct or incorrect.

5. The method of claim 2, whereby electronic circuit determines whether user activated correct or incorrect key or keys as indicated by color-coded visual notation on screen and indicates to user whether user's action was correct or incorrect;

determines whether user activated correct or incorrect key or keys as indicated by color-coded visual notation on screen plus corresponding simultaneously color-coded finger shapes and indicates to user whether user's action was correct or incorrect;

determines whether user activated correct or incorrect key or keys as indicated by color-coded visual notation on screen plus corresponding simultaneously illuminated key or keys and indicates to user whether user's action was correct or incorrect;

determines whether user activated correct or incorrect key or keys as indicated by color-coded visual notation on screen, corresponding color-coded finger shapes plus simultaneous vibration of corresponding keys and indicates to user whether user's action was correct or incorrect; and determines whether user activated correct or incorrect key or keys as indicated by color-coded visual notation on screen, corresponding simultaneously color-coded finger shapes, simultaneously illuminated keys, and vibration of keys and indicates to user whether user's action was correct or incorrect.

6. The method of claim 2, whereby electronic circuit determines whether user activated correct or incorrect key or keys as indicated by non-color-coded visual notation with color-coded fingering on screen and indicates to user whether user's action was correct or incorrect;

determines whether user activated correct or incorrect key or keys as indicated by non-color-coded visual notation with color-coded fingering on screen plus simultaneously corresponding color-coded finger shapes and indicates to user whether user's action was correct or incorrect;

determines whether user activated correct or incorrect key or keys as indicated by non-color-coded visual notation with color-coded fingering on screen plus corresponding simultaneously illuminated key or keys and indicates to user whether user's action was correct or incorrect;

determines whether user activated correct or incorrect key or keys as indicated by non-color-coded visual notation with color-coded fingering on screen, corresponding simultaneously color-coded finger shapes plus simultaneous vibration of corresponding keys and indicates to user whether user's action was correct or incorrect;

determines whether user activated correct or incorrect key or keys as indicated by non-color-coded visual notation with color-coded fingering on screen, corresponding simultaneously color-coded finger shapes, simultaneously illuminated keys, and simultaneous vibration of keys and indicates to user whether user's action was correct or incorrect;

determines whether user activated correct or incorrect key or keys as indicated by non-color-coded visual notation with non-color-coded fingering on screen plus corresponding simultaneously color-coded finger shapes and indicates to user whether user's action was correct or incorrect;

determines whether user activated correct or incorrect key or keys as indicated by non-color-coded visual notation on screen with non color-coded fingering plus corresponding simultaneously illuminated key or keys and indicates to user whether user's action was correct or incorrect;

determines whether user activated correct or incorrect key or keys as indicated by non-color-coded visual notation on screen with non color-coded fingering, corresponding simultaneously color-coded finger shapes and simultaneous vibration of corresponding keys and indicates to user whether user's action was correct or incorrect; and determines whether user activated correct or incorrect key or keys as indicated by non-color-coded visual notation on screen with non-color-coded fingering, corresponding simultaneously color-coded finger shapes, simultaneously illuminated keys, and simultaneous vibration of keys and indicates to user whether user's action was correct or incorrect.

7. The method of claim 4, wherein, determining that user activated correct shape or shapes as indicated by the illuminated shape or shapes, indicates to user that the user's action was correct, and proceeds to next action; or determining that user activated an incorrect shape or shapes as indicated by the illuminated shape or shapes and indicates to user that the user's action was incorrect, repeats correct action for user, and prompts user to repeat action;

determining that user activated a correct shape or shapes as indicated by the vibration of shape or shapes, indicates correct action to user and proceeds to next action; or determining that user activated an incorrect shape or shapes as indicated by the vibration of shape or shapes, indicates incorrect action to user, repeats correct action, and prompts user to repeat action;

determining that user activated a correct shape or shapes as indicated by the illumination of a finger shape or shapes as well as the vibration of shape or shapes, indicates correct action to user and proceeds to next action; or determining that user activated an incorrect shape or shapes as indicated by the illumination of a finger shape or shapes as well as the vibration of shape or shapes, indicates incorrect action to user, repeats correct action, and prompts user to repeat action;

determining that user activated a correct shape or shapes as indicated by the vibration of shape or shapes in a predetermined rhythm, indicates correct action to user and proceeds to next action; or determining that user activated an incorrect shape or shapes as indicated by the vibration of shape or shapes in a predetermined rhythm, indicates incorrect action to user, repeats correct action, and prompts user to repeat action;

determining that user activated a correct shape or shapes as indicated by the illumination of finger shape or shapes as well as the vibration of shape or shapes in a predetermined rhythm, indicates correct action to user, and proceeds to next action; or determining that user activated an incorrect shape or shapes as indicated by the illumination of a finger shape or shapes as well as the vibration of shape or shapes in a predetermined rhythm, indicates incorrect action to user, repeats correct action, and prompts user to repeat action;

determining that user activated a correct key or key as indicated by the multicolor illuminated key or keys, indicates correct action to user, and proceeds to next action; or determining that user activated an incorrect key or keys as indicated by the multi-color illuminated key or keys, indicates incorrect action to user, repeats correct action, and prompts user to repeat action;

determining that user activated a correct key or keys as indicated by the multicolor illuminated key or keys and illumination of shape or shapes, indicates correct action to user and proceeds to next action; or determining that user activated an incorrect key or keys as indicated by the multicolor illuminated key or keys and illumination of shape or shapes, indicates incorrect action to user, repeats correct action, and prompts user to repeat action;

determining that user activated a correct key or keys as indicated by the vibration of key or keys and illumination of shape or shapes, indicates correct action to user and proceeds to next action; or determining that user activated an incorrect key or keys as indicated by the vibration of key or keys and illumination of shape or shapes, indicates incorrect action to user, repeats correct action, and prompts user to repeat action;

determining that user activated a correct key or keys as indicated by the illuminated key or keys, by the vibration of key or keys, and illumination of shape or shapes, indicates correct action to user and proceeds to next action; or determining that user activated an incorrect key or keys as indicated by the illuminated key or keys, by the vibration of key or keys, and the illumination of shape or shapes, indicates incorrect action to user, repeats correct action, and prompts user to repeat action;

determining that user depressed a correct key or keys as indicated by the "white color" illuminated key or keys and color-coded finger shape or shapes, indicates correct action to user and proceeds to next action; or determining that user depressed an incorrect key or keys as indicated by the "white color" illuminated key or keys and color-coded finger shape or shapes, indicates incorrect action to user, repeats correct action, and prompts user to repeat action;

determining that user depressed a correct key or keys as indicated by the "white color" illuminated key or keys, simultaneous vibration of said key or keys and corresponding color-coded finger shape or shapes, indicates correct action to user and proceeds to next action; or determining that user depressed an incorrect key or keys as indicated by the "white color" illuminated key or keys, simultaneous vibration of said key or keys and corresponding color-coded finger shape or shapes; indicates incorrect action to user, repeats correct action, and prompts user to repeat action.

8. The method of claim 5, wherein determining that user activated a correct key as indicated by visual color-coded notation on screen, indicates correct action to user and proceeds to the next action; or determining that user activated an incorrect key as indicated by visual color-coded notation on screen, indicates incorrect action to user, and prompts user to repeat action;

determining that user activated a correct key as indicated visual color-coded notation on screen and corresponding color-coded finger shapes, indicates correct action to user and proceeds to next action; or determining that user activated an incorrect key as indicated by visual color-coded notation on screen and corresponding color-coded finger shapes, indicates incorrect action to user, and prompts user to repeat action;

determining that user activated a correct key as indicated by visual color-coded notation on screen and illuminated keys, indicates correct action to user and proceeds to next action; or determining that user activated an incorrect key as indicated by visual color-coded notation on screen and illuminated keys indicates incorrect action to user, and prompts user to repeat action;

determining that user activated correct key as indicated by visual color-coded notation on screen, corresponding color-coded shapes, plus the vibration of corresponding keys, indicates correct action to user and proceeds to next action; or determining that user activated an incorrect key as indicated by visual color-coded notation on screen, corresponding color-coded shapes plus the vibration of corresponding keys, indicates incorrect action to user, and prompts user to repeat action.

9. The method of claim 6, wherein determining that user activated correct key as indicated by visual non-color-coded notation on screen, indicates correct action to user and proceeds to next action; or determining that user activated an incorrect key as indicated by visual non-color-coded notation on screen, indicates incorrect action to user, and prompts user to repeat action;

determining that user activated correct key as indicated by visual non-color-coded notation on screen and corresponding color-coded finger shapes, indicates correct action to user and proceeds to next action; or determining that user activated an incorrect key as indicated by visual non-color-coded notation on screen and corresponding color-coded finger shapes, indicates incorrect action to user, and prompts user to repeat action;

determining that user activated correct key as indicated by visual non-color-coded notation on screen and illuminated keys indicates correct action to user and proceeds to next action; or determining that user activated an incorrect key as indicated by visual non-color-coded notation on screen and illuminated keys indicates incorrect action to user, and prompts user to repeat action;

determining that user activated correct key as indicated by visual non-color-coded notation on screen, corresponding color-coded shapes, plus the vibration of corresponding keys, indicates correct action to user and proceeds to next action; or determining that user activated an incorrect key as indicated by visual non-color-coded notation on screen, corresponding color-coded shapes plus the vibration of corresponding keys, indicates incorrect action to user, and prompts user to repeat action;

determining that user activated correct key as indicated by visual non-color-coded notation on screen, corresponding illuminated keys, corresponding color-coded shapes, plus vibration of corresponding keys, indicates correct action to user and proceeds to next action; or determining that user activated an incorrect key as indicated by visual non-color-coded notation on screen, corresponding illuminated keys, corresponding color-coded shapes plus vibration of corresponding keys, indicates incorrect action to user, and prompts user to repeat action;

determining that user activated correct key as indicated by visual non-color-coded notation on screen, indicates correct action to user and proceeds to next action; or determining that user activated an incorrect key as indicated by visual non-color-coded notation on screen, indicates incorrect action to user, and prompts user to repeat action;

that user activated correct key as indicated by visual non-color-coded notation on screen and corresponding color-coded finger shapes, indicates correct action to user and proceeds to next action; or determining that user activated an incorrect key as indicated by visual non-color-coded notation on screen and illuminated keys indicates incorrect action to user, and prompts user to repeat action;

determining that user activated correct key as indicated by visual non-color-coded notation on screen, corresponding color-coded shapes, plus the vibration of corresponding keys, indicates correct action user and proceeds to next action; or determining that user activated an incorrect key as indicated by visual non-color-coded notation on screen, corresponding color-coded shapes plus the vibration of corresponding keys, indicates incorrect action to user, and prompts user to repeat action;

determining that user activated correct key as indicated by visual non-color-coded notation on screen, corresponding illuminated keys, corresponding color-coded shapes, plus vibration of corresponding keys, indicates correct action to user and proceeds to next action;

determining that user activated an incorrect key as indicated by visual non-color-coded notation on screen, corresponding illuminated keys, corresponding color-coded shapes plus vibration of corresponding keys, indicates incorrect action to user, and prompts user to repeat action;

determining that user activated correct key as indicated by visual non-color-coded notation and color-coded fingering on screen, indicates correct action to user and proceeds to next action; or determining that user activated an incorrect key as indicated by visual non-color-coded notation and color-coded fingering on screen, indicates incorrect action to user, and prompts user to repeat action;

determining that user activated correct key as indicated by visual non-color-coded notation and color-coded fingering on screen and corresponding color-coded finger shapes, indicates correct action to user and proceeds to next action; or determining that user activated an incorrect key as indicated by visual non-color-coded notation and color-coded fingering on screen and corresponding color-coded finger shapes, indicates incorrect action to user, and prompts user to repeat action;

determining that user activated correct key as indicated by visual non-color-coded notation and color-coded fingering on screen and illuminated keys, indicates correct action to user and proceeds to next action; or determining that user activated an incorrect key as indicated by visual non-color-coded notation and color-coded fingering on screen and illuminated keys, indicates incorrect action to user, and prompts user to repeat action;

determining that user activated correct key as indicated by visual non-color-coded notation and color-coded fingering on screen, corresponding color-coded shapes plus the vibration of corresponding keys, indicates correct action to user and proceeds to next action; or determining that user activated an incorrect key as indicated by visual non-color-coded notation and color-coded fingering on screen, corresponding color-coded shapes plus the vibration of corresponding keys, indicates incorrect action to user, and prompts user to repeat action;

determining when user activated correct key as indicated by visual non-color-coded notation and color-coded fingering on screen, corresponding color-coded shapes plus vibration of corresponding keys, said electronic circuit indicates correct action to user and proceeds to next action; or determining that user activated an incorrect key as indicated by visual non-color-coded notation and color-coded fingering on screen, corresponding color-coded shapes plus vibration of corresponding keys, indicates incorrect action to user, and prompts user to repeat action;

determining that user activated correct key as indicated by visual non-color-coded notation on screen and non-color-coded fingering, indicates correct action to user and proceeds to next action; or determining that user activated an incorrect key as indicated by visual non-color-coded notation on screen and non-color-coded fingering, indicates incorrect action to user, and prompts user to repeat action;

determining that user activated correct key as indicated by visual non-color-coded notation on screen and non-color-coded fingering and corresponding color-coded finger shapes, indicates correct action to user and proceeds to next action; or determining that user activated an incorrect key as indicated by visual non-color-coded notation on screen and non-color-coded fingering and corresponding color-coded finger shapes, indicates incorrect action to user, and prompts user to repeat action;

determining that user activated correct key as indicated by visual non-color-coded notation on screen and non-color-coded fingering and illuminated keys, indicates correct action to user and proceeds to next action; or determining that user activated an incorrect key as indicated by visual non-color-coded notation on screen and non-color-coded fingering and illuminated keys, indicates incorrect action to user, and prompts user to repeat action;

determining that user activated correct key as indicated by visual non-color-coded notation on screen and non-color-coded fingering, corresponding color-coded shapes plus vibration of corresponding keys, indicates correct action to user and proceeds to next action; or determining that user activated an incorrect key as indicated by visual non-color-coded notation on screen and non-color-coded fingering, corresponding color-coded shapes plus the vibration of corresponding keys, indicates incorrect action to user, and prompts user to repeat action;

determining that user activated correct key as indicated by visual non-color-coded notation on screen and non-color-coded fingering, illuminated keys, corresponding color-coded shapes, plus vibration of corresponding keys, indicates correct action to user and proceeds to next action; or determining that user activated an incorrect key as indicated by visual non-color-coded notation on screen and non-color-coded fingering, illuminated keys, corresponding color-coded shapes plus vibration of corresponding keys, indicates incorrect action to user, and prompts user to repeat action.

10. The method of claim 7, whereby;

when electronic circuit determines that user incorrectly repeats an action a multiple number of times as predetermined by electronic circuit program, electronic circuit will discontinue present action or activity and revert to a previous action or activity for the user, as in;

when electronic circuit determines that user activated an incorrect shape or shapes multiple times as indicated by the illumination of shape or shapes, indicated to the user that the user's action was incorrect, repeated correct action, and prompted user to try again; and if user incorrectly repeats action multiple times, electronic circuit will discontinue present action and revert to a previous action for the user;

when electronic circuit determines that user activated an incorrect shape or shapes as indicated by the illuminated shape or shapes and vibration of said shape or shapes, indicated to the user that the user's action was incorrect, repeated correct action, and prompted user to try again; and if user incorrectly repeats action multiple times, electronic circuit will discontinue present action and revert to a previous action for the user;

when electronic circuit determines that user activated an incorrect key or keys as indicated by the illuminated key or keys, indicated to the user that the user's action was incorrect, repeated correct action, and prompted user to try again; and if user incorrectly repeats action multiple times, electronic circuit will discontinue present action and revert to a previous action for the user;

when electronic circuit determines that user activated an incorrect key or keys as indicated by the illuminated key or keys together with the illuminated shape or shapes, indicated to the user that the user's action was incorrect, repeated correct action for user, and prompted user to try again; and if user incorrectly repeats action multiple times, electronic circuit will discontinue present action and revert to a previous action for the user;

when electronic circuit determines that user activated an incorrect key or keys as indicated by the vibrating key or keys together with the illuminating shape or shapes, indicated to the user that the user's action was incorrect, repeated correct action for user, and prompted user to try again; and if user incorrectly repeats action multiple times, electronic circuit will discontinue present action and revert to a previous action for the user;

when electronic circuit determines that user activated an incorrect key or keys as indicated by the illuminated key or keys together with vibration of key or keys together with illumination of shape or shapes, indicated to the user that the user's action was incorrect, repeated correct action for user, and prompted user to try again; and if user incorrectly repeats action multiple times, electronic circuit will discontinue present action and revert to a previous action for the user;

when electronic circuit determines that user activated an incorrect key or keys as indicated by the "white color" illuminated key or keys and color-coded finger shape or shapes, computer indicated to the user that the user's action was incorrect, repeated correct action for user, and prompted user to try again, and if user incorrectly repeats action predetermined multiple times, electronic circuit discontinues present activity and reverts to a previous activity for the user; and when electronic circuit determines that user activated an incorrect key or keys as indicated by the "white color" illuminated key or keys, simultaneous vibration of said key or keys, and corresponding color-coded finger shape or shapes; indicated to the user that the user's action was incorrect, repeated correct action for user, and prompted user to try again, and if user incorrectly repeats action pre-determined multiple times, electronic circuit discontinues present activity and reverts to a previous activity for the user.

11. The method of claim 8, whereby when electronic circuit determines that user incorrectly repeats an action a multiple number of times as pre-determined by electronic circuit program, electronic circuit will discontinue present action or activity and revert to a previous action or activity for the user, as in;

when electronic circuit determines that user activated an incorrect key or keys as indicated by visual color-coded notation on screen, indicated incorrect action to user, and user activated incorrect key multiple times, electronic circuit discontinues present activity and reverts to a previous activity for the user;

when electronic circuit determines that user activated an incorrect key or keys as indicated by visual color-coded notation on screen and corresponding color-coded shapes, indicated incorrect action to user, and user activated incorrect key or keys multiple times, electronic circuit discontinues present activity and reverts to a previous activity for the user;

when electronic circuit determines that user activated an incorrect key or keys as indicated by visual color-coded notation on screen plus corresponding illuminated keys, indicated incorrect action to user, and user activated incorrect key or keys multiple times, electronic circuit discontinues present activity and reverts to a previous activity for the user;

when electronic circuit determines that user activated an incorrect key or keys as indicated by visual color-coded notation on screen, corresponding color-coded finger shapes, and vibration of corresponding keys, indicated incorrect action to user, and user activated incorrect key or keys multiple times, electronic circuit discontinues present activity and reverts to a previous activity for the user; and when electronic circuit determines that user activated an incorrect key or keys as indicated by visual color-coded notation on screen, corresponding color-coded finger shapes, illuminated keys, and vibration of corresponding keys, indicated incorrect action to user, and user activated incorrect key or keys multiple times, said electronic circuit discontinues present activity and reverts to a previous activity for the user.

12. The method of claim 9, whereby when electronic circuit determines that user incorrectly repeats an action a multiple number of times as pre-determined by electronic circuit program, electronic circuit will discontinue present action or activity and revert to a previous action or activity for the user, as in;

when electronic circuit determines that user activated an incorrect key as indicated by visual non-color-coded notation on screen, corresponding illuminated keys, corresponding color-coded shapes, plus vibration of corresponding keys, indicated incorrect action to user, and user activated incorrect key or keys multiple times, discontinues present activity and reverts to a previous activity for the user;

when electronic circuit determines that user activated an incorrect key or keys as indicated by visual non-color-coded notation and color-coded fingering on screen, indicated incorrect action to user, and user activated incorrect key or keys multiple times, said electronic circuit discontinues present activity and reverts to a previous activity for the user;

when electronic circuit determines that user activated an incorrect key or keys as indicated by visual non-color-coded notation and color-coded fingering on screen and corresponding color-coded shapes, indicated incorrect action to user, and user activated incorrect key or keys multiple times, electronic circuit discontinues present activity and reverts to a previous activity for the user;

when electronic circuit determines that user activated an incorrect key or keys as indicated by visual non-color-coded notation and color-coded fingering on screen plus corresponding illuminated keys, indicated incorrect action to user, and user activated incorrect key or keys multiple times, electronic circuit discontinues present activity and reverts to a previous activity for the user;

when electronic circuit determines that user activated an incorrect key or keys as indicated by visual non-color-coded notation and color-coded fingering on screen, corresponding color-coded finger shapes, and vibration of corresponding keys, indicated incorrect action to user, and user activated incorrect key or keys multiple times, said electronic circuit discontinues present activity and reverts to a previous activity for the user;

when electronic circuit determines that user activated an incorrect key or keys as indicated by visual non-color-coded notation and color-coded fingering on screen, corresponding color-coded finger shapes, illuminated keys, and vibration of corresponding keys, indicated incorrect action to user, and user activated incorrect key or keys multiple times, said electronic circuit discontinues present activity and reverts to a previous activity for the user;

when electronic circuit determines that user activated an incorrect key or keys as indicated by visual non-color-coded notation on screen and non-color-coded fingering, indicated incorrect action to user, and user activated incorrect key or keys multiple times, electronic circuit discontinues present activity and reverts to a previous activity for the user;

when electronic circuit determines that user activated an incorrect key or keys as indicated by visual non-color-coded notation on screen and non-color-coded fingering and corresponding color-coded shapes, indicated incorrect action to user, and user activated incorrect key or keys multiple times, said electronic circuit discontinues present activity and reverts to a previous activity for the user;

when electronic circuit determines that user activated an incorrect key or keys as indicated by visual non-color-coded notation and non-color-coded fingering on screen plus corresponding illuminated keys, indicated incorrect action to user, and user activated incorrect key or keys multiple times, electronic circuit discontinues present activity and reverts to a previous activity for the user;

when electronic circuit determines that user activated an incorrect key or keys as indicated by visual non-color-coded notation and non-color-coded fingering on screen, corresponding color-coded finger shapes, and vibration of corresponding keys, indicated incorrect action to user, and user activated incorrect key multiple times, said electronic circuit discontinues present activity and reverts to a previous activity for the user; and when electronic circuit determines that user activated an incorrect key or keys as indicated by visual non-color-coded notation and non-color-coded fingering on screen, corresponding color-coded finger shapes, illuminated keys, and vibration of corresponding keys, indicated incorrect action to user, and user activated incorrect key multiple times, electronic circuit discontinues present activity and reverts to a previous activity for the user.

* * * * *